United States Patent
Nakata

(10) Patent No.: US 11,325,586 B2
(45) Date of Patent: May 10, 2022

(54) AUTONOMOUS DRIVING CONTROL DEVICE, AUTONOMOUS MOBILE VEHICLE, AND AUTONOMOUS MOBILE VEHICLE CONTROL SYSTEM

(71) Applicant: Hitachi Automotive Systems, Ltd., Hitachinaka (JP)

(72) Inventor: Hiroaki Nakata, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 314 days.

(21) Appl. No.: 16/622,406

(22) PCT Filed: Jul. 19, 2018

(86) PCT No.: PCT/JP2018/027037
§ 371 (c)(1),
(2) Date: Dec. 13, 2019

(87) PCT Pub. No.: WO2019/026633
PCT Pub. Date: Feb. 7, 2019

(65) Prior Publication Data
US 2020/0198620 A1   Jun. 25, 2020

(30) Foreign Application Priority Data
Jul. 31, 2017  (JP) .............................. JP2017-147349

(51) Int. Cl.
*B60W 30/06*   (2006.01)
*H04W 4/44*    (2018.01)
(Continued)

(52) U.S. Cl.
CPC ............ *B60W 30/06* (2013.01); *B60W 40/08* (2013.01); *B60W 50/10* (2013.01);
(Continued)

(58) Field of Classification Search
CPC ...... B60W 30/06; B60W 40/08; B60W 50/10; B60W 60/001; B60W 60/005;
(Continued)

(56) References Cited

U.S. PATENT DOCUMENTS 10,964,218 B2 * 3/2021 Kuhara ................ G05D 1/0016
2006/0248222 A1 * 11/2006 Saito ....................... H04L 67/12
709/238

(Continued)

FOREIGN PATENT DOCUMENTS

CN      113615250 A  * 11/2021  ........ H04W 36/0005
DE  10 2011 104 061 A1  12/2012
(Continued)

OTHER PUBLICATIONS

International Search Report (PCT/ISA/210) issued in PCT Application No. PCT/JP2018/027037 dated Nov. 20, 2018 with English translation (five pages).

(Continued)

*Primary Examiner* — Dale W Hilgendorf
(74) *Attorney, Agent, or Firm* — Crowell & Moring LLP

(57) ABSTRACT

The present invention makes it possible for an infrastructure facility to temporarily acquire control authority for the likes of moving of an automatic driving vehicle while suppressing security risks, and to realize simple operations when loading or unloading vehicles. This control device is for controlling a vehicle that moves autonomously, and comprises a function for controlling the movement of the vehicle in accordance with instructions from an external system. When the function for controlling the movement of the vehicle in accordance with instructions from the external system is activated, the control device recognizes the validity of the external system by communicating with the external system and the vehicle, recognizes that encrypted communication (Continued)

with the external system has been established, recognizes that the user of the vehicle is permitted by the external system to move the vehicle, and recognizes that the user is an authorized user of the vehicle.

11 Claims, 19 Drawing Sheets

(51) Int. Cl.
  *B60W 40/08* (2012.01)
  *G06F 21/32* (2013.01)
  *G05D 1/02* (2020.01)
  *B60W 60/00* (2020.01)
  *B60W 50/10* (2012.01)
  *G08G 1/14* (2006.01)

(52) U.S. Cl.
  CPC ........ *B60W 60/001* (2020.02); *B60W 60/005* (2020.02); *B60W 60/0053* (2020.02); *G05D 1/0276* (2013.01); *G06F 21/32* (2013.01); *H04W 4/44* (2018.02); *B60W 2040/0809* (2013.01); *G08G 1/144* (2013.01)

(58) Field of Classification Search
  CPC ...... B60W 60/0053; B60W 2040/0809; G05D 1/0276; G06F 21/32; H04W 4/44; G08G 1/144
  See application file for complete search history.

(56) References Cited

U.S. PATENT DOCUMENTS

| | | | |
|---|---|---|---|
| 2013/0151070 A1 | 6/2013 | Bock et al. | |
| 2014/0136020 A1* | 5/2014 | Halder | G05D 1/0276 701/2 |
| 2017/0305389 A1 | 10/2017 | Nordbruch | |
| 2017/0305467 A1* | 10/2017 | Nordbruch | G08G 1/146 |
| 2017/0327125 A1 | 11/2017 | Nordbruch | |
| 2018/0072345 A1* | 3/2018 | Nicodemus | B62D 15/0285 |
| 2019/0054926 A1* | 2/2019 | Wasekura | B60W 50/12 |
| 2019/0066516 A1* | 2/2019 | Kuhara | G08G 1/202 |
| 2019/0111916 A1* | 4/2019 | Lee | G06K 9/00812 |

FOREIGN PATENT DOCUMENTS

| | | | | |
|---|---|---|---|---|
| DE | 10 2014 221 772 A1 | | 4/2016 | |
| DE | 10 2014 224 075 A1 | | 6/2016 | |
| DE | 10 2014 224 108 A1 | | 6/2016 | |
| DE | 10 2015 202 478 A1 | | 8/2016 | |
| DE | 10 2015 208 068 A1 | | 11/2016 | |
| DE | 10 2016 201 067 A1 | | 7/2017 | |
| JP | 2006-311132 A | | 11/2006 | |
| JP | 2008-120284 A | | 5/2008 | |
| JP | 2009216729 A | * | 9/2009 | ............... G09G 5/00 |
| JP | 2012-67489 A | | 4/2012 | |
| JP | 2015-219811 A | | 12/2015 | |
| JP | 2016-6603 A | | 1/2016 | |
| JP | 2018077652 A | * | 5/2018 | ............. G06F 21/32 |
| WO | WO-2006101169 A1 | * | 9/2006 | ......... H04L 63/0861 |

OTHER PUBLICATIONS

Japanese-language Written Opinion (PCT/ISA/237) issued in PCT Application No. PCT/JP2018/027037 dated Nov. 20, 2018 (five pages).

German-language Office Action issued in German Application No. 11 2018 002 342.7 dated Oct. 25, 2021 with English translation (nine (9) pages).

* cited by examiner

→ AUTONOMOUS MOVEMENT FOLLOWING INSTRUCTIONS FROM INFRASTRUCTURE FACILITY

⟶ AUTONOMOUS MOVEMENT FOLLOWING INSTRUCTIONS FROM INFRASTRUCTURE FACILITY

--⟶ MOVEMENT BY DRIVING BY USER

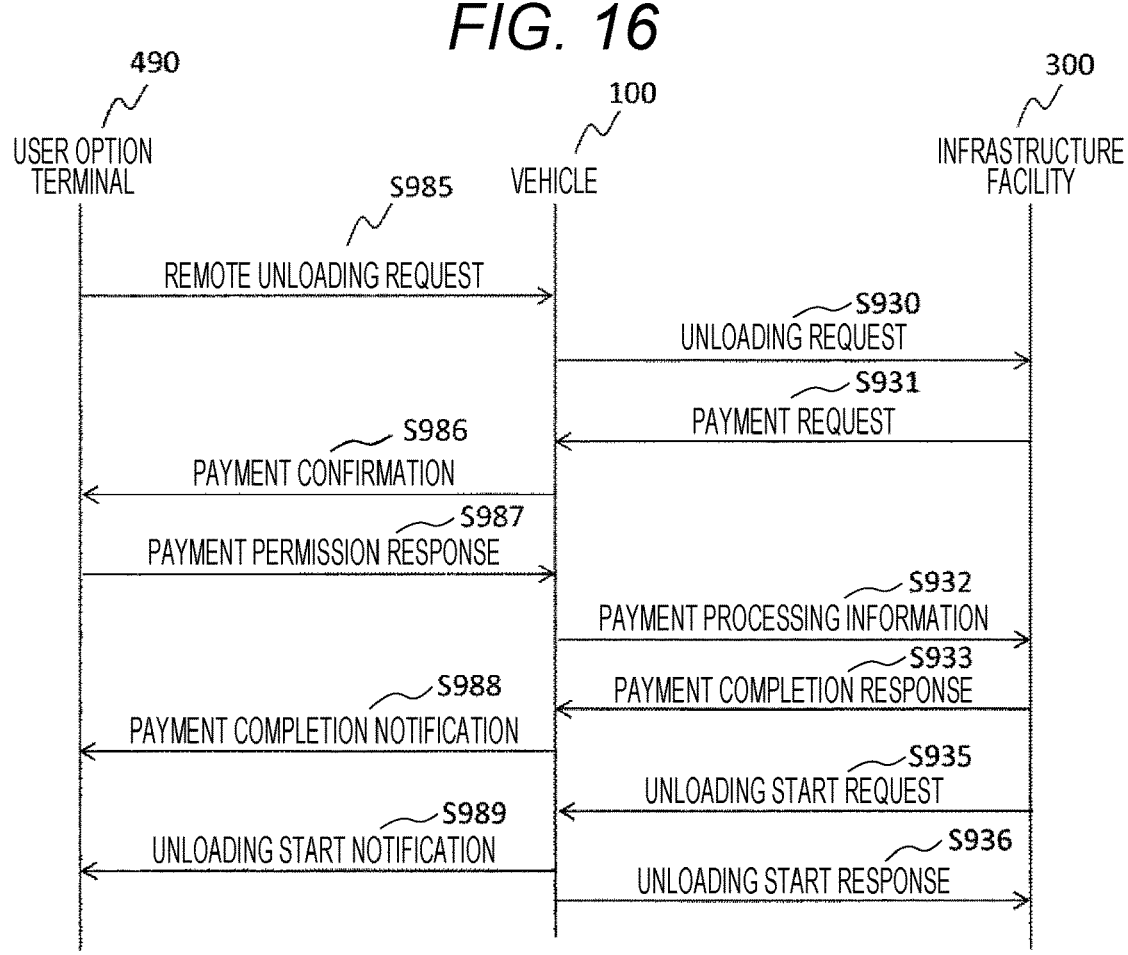

FIG. 18

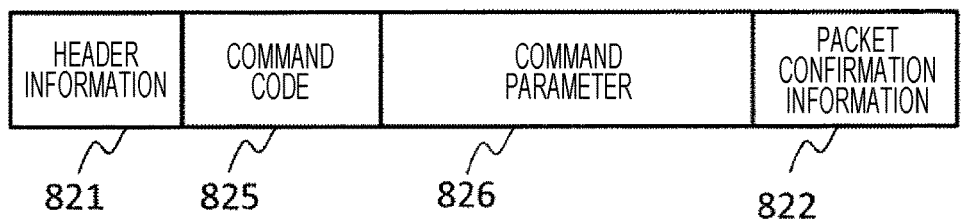

| HEADER INFORMATION | COMMAND CODE | COMMAND PARAMETER | PACKET CONFIRMATION INFORMATION |
| 821 | 825 | 826 | 822 |

FIG. 19

| COMMUNICATION NAME | INFORMATION INCLUDED IN COMMAND PARAMETERS |
|---|---|
| SUPPORTING SECURITY SCHEME NOTIFICATION  S905 | AVAILABLE ENCRYPTION SCHEME LIST ON SIDE OF VEHICLE<br>RANDOM NUMBER ON SIDE OF VEHICLE FOR GENERATING COMMON KEY MASTER |
| SECURITY SCHEME SELECTION NOTIFICATION  S906 | SECURITY SCHEME ACTUALLY USED<br>RANDOM NUMBER ON SIDE OF INFRASTRUCTURE FOR GENERATING COMMON KEY MASTER |
| INFRASTRUCTURE CERTIFICATE  S907 | CERTIFICATE INFORMATION ON SIDE OF INFRASTRUCTURE<br>(INCLUDING PUBLIC KEY FOR PUBLIC KEY ENCRYPTION) |
| COMMON KEY GENERATION INFORMATION PROVISION REQUEST  S908 | |
| COMMON KEY GENERATION INFORMATION  S909 | RANDOM NUMBER FOR GENERATING COMMON KEY MASTER<br>(RANDOM NUMBER ENCRYPTED WITH PUBLIC KEY ON SIDE OF INFRASTRUCTURE) |
| VEHICLE SIDE COMMON KEY PREPARATION COMPLETION NOTIFICATION  S910 | |
| VEHICLE SIDE COMMUNICATION PREPARATION CONFIRMATION CODE  S911 | HASH VALUE OF CONTENT OBTAINED BY COMBINING CONTENT OF COMMUNICATION AND COMMON KEY MASTER |
| INFRASTRUCTURE SIDE COMMON KEY PREPARATION COMPLETION NOTIFICATION  S912 | |
| INFRASTRUCTURE SIDE COMMUNICATION PREPARATION CONFIRMATION CODE  S913 | HASH VALUE OF CONTENT OBTAINED BY COMBINING CONTENT OF COMMUNICATION AND COMMON KEY MASTER |

·──·──·──·──·──> AUTONOMOUS MOVEMENT NOT FOLLOWING INSTRUCTIONS FROM INFRASTRUCTURE FACILITY

AUTONOMOUS DRIVING CONTROL DEVICE, AUTONOMOUS MOBILE VEHICLE, AND AUTONOMOUS MOBILE VEHICLE CONTROL SYSTEM

TECHNICAL FIELD

The present invention relates to a control device for an automobile that can be autonomous moved and parked, an automobile controlled by the control device, an infrastructure facility such as a parking management facility that issues an instruction to the automobile, and a system that includes the automobile and the infrastructure facility.

BACKGROUND ART

Technological development related to autonomous mobile vehicles, so-called automatic driving vehicles, has progressed. As a result, recently it has been technically possible to move and park a driverless automobile to and at a desired location. There have been ideas of using such a function for providing various services in a parking lot and for efficient use of the parking lot.

PTL 1 describes a vehicle control system using an automatic driving vehicle for unloading a vehicle parked in a parking lot by autonomous driving, and also mentions about provision of a car wash service and a charging service in the parking lot.

PTL 2 describes that a parking space without a passage is prepared, and an instruction is issued from a parking management facility to a vehicle to move the vehicle for efficiently managing the parking lot.

CITATION LIST

Patent Literature

PTL 1: JP 2015-219811A
PTL 2: JP 2016-6603A

SUMMARY OF INVENTION

Technical Problem

However, movement of a vehicle according to information or instructions provided by an infrastructure facility such as a parking management facility means that a person other than a person (authorized user) who has driving authority for the vehicle moves the vehicle. Thus, security measures such as burglar proofing and mischief prevention are required. Specifically, it is necessary to take measures such as making the infrastructure facility temporarily acquire the authority to move the vehicle based on the consent of the authorized user. PTL 2 discloses a method related to such a measure. The method includes transmitting a temporary password from a user terminal to a vehicle and a parking management facility at the time of loading in the parking lot, communicating between the vehicle and the parking management facility while performing authentication using the temporary password, and moving the vehicle by the parking management facility.

However, this method requires the user terminal to communicate not only with the vehicle but also with the parking management facility. This is not easy for a simple user terminal such as a small wireless authentication terminal provided to a vehicle (a terminal corresponding to a vehicle key which is known as a smart key and the like). Furthermore, transmission of a temporary password from the user terminal to the infrastructure facility involves the following risk. Specifically, the communication might be intercepted and the temporary password might be stolen, resulting in the vehicle being controlled using the password. Furthermore, there is a risk that an entity pretending to be the infrastructure facility might communicate with the user terminal, and acquire the temporary password to control the vehicle.

An object of the present invention is to enable an infrastructure facility to temporarily acquire control authority for the likes of moving of an automatic driving vehicle while suppressing security risks, and to realize simple operations when loading or unloading vehicles.

Solution to Problem

An example of the present invention for achieving the above object is a control device for controlling a vehicle that moves autonomously, the control device including a function for controlling a movement of the vehicle in accordance with instructions from an external system. When the function for controlling the movement of the vehicle in accordance with instructions from the external system is activated, the control device recognizes the validity of the external system by communicating with the external system and the vehicle, recognizes that encrypted communication with the external system has been established, recognizes that the user of the vehicle is permitted by the external system to move the vehicle, and recognizes that the user is an authorized user of the vehicle.

A vehicle that moves autonomously, and includes a function for moving in accordance with instructions from an external system. When the function for controlling a movement in accordance with instructions from the external system is activated, the vehicle checks the validity of the external system by communicating with the external system, recognizes that encrypted communication with the external system has been established, recognizes that a user of the vehicle permits a movement in accordance with instructions from the external system, and recognizes that the user is an authorized user of the vehicle.

A system causes a vehicle to move autonomously. When the system instructs the vehicle to move and activates a movement of the vehicle, the system communicates with the vehicle to make the vehicle recognize a validity of the system, make the vehicle recognize that encrypted communication has been established, make the vehicle recognize that a user of the vehicle permits the vehicle to move autonomously, and make the vehicle recognize that the user is an authorized user of the vehicle.

Advantageous Effects of Invention

The present invention makes it possible for an infrastructure facility to temporarily acquire control authority for the likes of moving of an automatic driving vehicle while suppressing security risks, and to realize simple operations when loading or unloading vehicles to or from this environment.

BRIEF DESCRIPTION OF DRAWINGS

FIG. 16 is an example of a communication procedure among a user option terminal, the vehicle, and the infrastructure facility at the time of unloading.

FIG. 17 illustrates an example of information included in command parameters for communication between the infrastructure facility and the vehicle at the entrance gate.

FIG. 18 illustrates an example of a configuration of a communication packet in communication involved in establishment of secure communication between the infrastructure facility and the vehicle.

FIG. 19 illustrates an example of information included in command parameters in communication involved in establishment of secure communication between the infrastructure facility and the vehicle.

DESCRIPTION OF EMBODIMENTS

Hereinafter, embodiments of the present invention will be described with reference to the drawings.

First Embodiment

Figure 1:
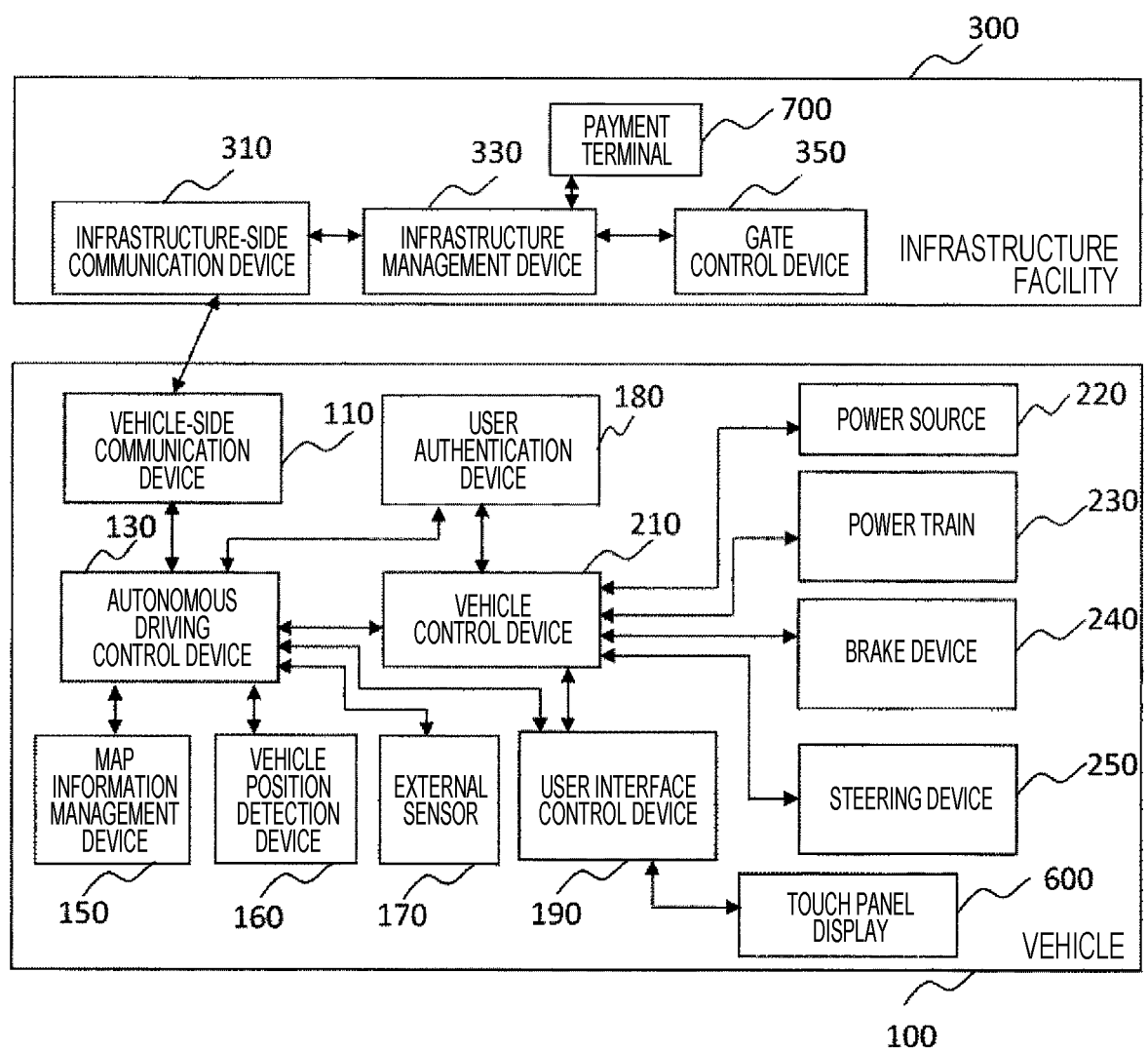
FIG. 1 illustrates an example of an overall configuration of an autonomous mobile vehicle and infrastructure facility that issues instructions to the vehicle.

A system configuration according to an embodiment of the present invention will be described with reference to FIG. 1. In this embodiment, it is assumed that an infrastructure facility 300 is a facility that mainly used for parking a vehicle 100.

An infrastructure management device 330 manages and controls the infrastructure facility 300 as a whole, to implement a movement plan for the vehicle 100 in a region managed by the infrastructure facility 300, that is, an infrastructure facility management region 301, a resource allocation plan, fee management, and the like. A gate control device 350 connected to the infrastructure management device 330 controls the opening and closing of gates at the entrance and exit of the infrastructure facility. A payment terminal 700 is a terminal used by a user of the infrastructure facility 300 to pay a fee in cash and call a loaded vehicle.

An infrastructure-side communication device 310 is a device that communicates with the vehicle 100 in the infrastructure facility management region 301 and the vehicle 100 entering and exiting, and has a function for performing encrypted communication with authentication. Furthermore, it has a function for using a plurality of types of communication schemes as required. For example, a configuration may be employed in which Dedicated Short Range Communications (DSRC) is used at an area around an entrance gate 11 to certainly provide information, required for network connection to a wireless LAN used in the infrastructure facility management region 301, to each vehicle 100 entering the infrastructure facility management region 301, and a wireless LAN is used in the infrastructure facility management region 301. In such a case, the infrastructure-side communication device 310 has functions for performing communication using the dedicated short range communications and the wireless LAN.

With the dedicated short range communications used at the entrance gate 11 to provide wireless LAN connection information to each vehicle, and with the wireless LAN used in the infrastructure facility management region 301 by using the connection information, a large parking lot can be efficiently covered. In a case of an extremely huge parking lot, it may be possible to use other communication schemes such as a mobile phone network instead of the wireless LAN.

A plurality of the gate control devices 350 may be prepared depending on the number and locations of entrance gates 11 and exit gates 12, and a plurality of the payment terminals 700 may be prepared depending on the frequency of use and the number and locations entrances and exits, provided to the parking lot, for vehicle passengers. Furthermore, a plurality of the infrastructure-side communication devices 310 may be prepared depending on the size of the parking lot or a communication scheme. In such a case, information necessary for communication with the vehicle 100 is shared between the devices.

The vehicle 100 that can be controlled from the infrastructure facility 300 includes components for implementing basic functions as a vehicle including: a power source 220 (such as an engine, a motor, and its drive circuit) that provides power; a power train 230 that transmits the power to the tires; a brake device 240 that controls the brake; a steering device 250 for controlling the traveling direction; and a vehicle control device 210 that performs overall control of these components. The vehicle control device 210 may include a plurality of electronic control devices for engine control, steering control, vehicle behavior control, and the like.

A user interface control device 190 is connected to the vehicle control device 210. The user interface control device 190 serves as a device that displays the state of the vehicle and is used for performing operation setting for the vehicle. The user interface control device 190 is further connected to a touch panel display 600 that presents information to the user 21 and is used for the user 21 to perform operations.

Figure 9:
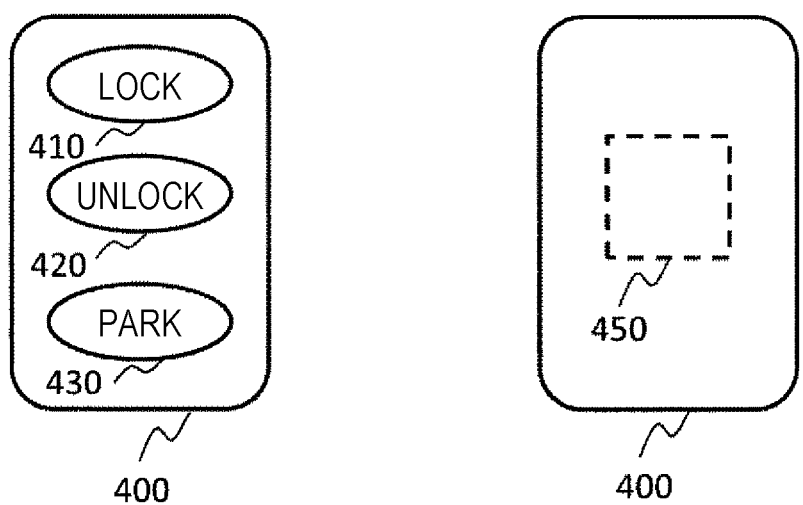
FIG. 9 illustrates an example of user terminal.

A user authentication device 180 is also connected to the vehicle control device 210. The user authentication device 180 is a device that performs authentication for the user 21 to confirm whether the user is an authorized user of the vehicle 100. When a small wireless user terminal 400 (such as a smart key), as illustrated in FIG. 9, is used as a key of the vehicle 100, such a terminal includes functions for determining the presence or absence of the user terminal 400 through encrypted communication and for determining whether the user terminal 400 is inside or outside the vehicle. In order to determine whether the terminal is inside or outside the vehicle, long waves are used as radio waves transmitted from the user authentication device 180 to the user terminal 400, and antennas are appropriately installed inside and outside the vehicle 100 to appropriately adjust the electric field strength.

The user authentication device 180 may be include a plurality of devices such as a that in charge of performs authentication, that in charge of transmitting radio waves to the user authentication device 180, and that in charge of receiving radio waves transmitted from the user authentication device 180.

The user terminal 400 that communicates with the user authentication device 180 is a device as illustrated in FIG. 9 that can be carried around by the user 21, and includes a "lock" 410 button used for locking a door of the vehicle 100, an "unlock" "420" button used for unlocking the door, and a "park" 430 button for giving an instruction on initiation of autonomous parking after locking the door of the vehicle 100 as appropriate. The terminal further includes a near field communication antenna 450 for exchanging information with a touched device.

The user authentication device 180 may have a configuration not involving the use of the user terminal 400. For example, a biometric authentication sensor for fingerprints and finger veins may be arranged in the vicinity of a vehicle door or at a start switch portion for an engine and the like, and may be connected to be used in place of the operation on the user terminal 400. In this case, for example, a touched location, whether a touched part, a way of touching (how many times and how long the touching is performed), and a state of the vehicle 100 at the time of touching correspond to an operation of pressing the buttons of the user terminal 400.

Even when the user terminal 400 is required, the user authentication terminal 180 may support an operation using biometric authentication instead of using the user terminal 400. Furthermore, presence of the user authentication terminal 400 and a predetermined operation on the vehicle 100 (touching a portion near the door) may be performed as an operation equivalent to an operation on a button of the user terminal 400, instead of actually using the button of the user authentication terminal 400. In this case, some or all of the buttons may be omitted from the user terminal 400.

The vehicle 100 includes an autonomous driving control device 130 that performs control required for moving the vehicle without the driver, such as in a case of automatic valet parking. The autonomous driving control device 130 is connected to an external sensor 170 for recognizing a state of the surroundings of the vehicle, a map information management device 150 that manages detailed map information, and a vehicle position detection device 160 that detects the current position. In addition, a vehicle-side communication device 110 that can communicate with the infrastructure-side communication device 310 is connected, and can receive information and instructions from the infrastructure facility 300 and issue a response to the infrastructure facility 300. The autonomous driving control device 130 can comprehensively determine information and instructions from these devices and issue an operation instruction for the vehicle 100 to the vehicle control device 210, to move the vehicle 100 to a target location.

The autonomous driving control device 130 is also connected to the user authentication device 180, and thus can confirm whether an operation is performed by an authorized user having the driving authority of the vehicle 100.

The autonomous driving control device 130 is also connected to the user interface control device 190, and thus can notify the user 21 of information related to autonomous driving and information as well as notifications from the infrastructure facility 300 and the like, and receive a response from the user 21.

The map information management device 150 has functions for holding detailed map information necessary for movement in the infrastructure facility management region 301 acquired from the side of the infrastructure facility 300 via the vehicle-side communication device 110 and the autonomous driving control device 130, and for providing the detailed map information related to surroundings of the vehicle 100 and to the moving direction of the vehicle 100 to the autonomous driving control device 130, in response to a request from thee autonomous driving control device 130.

Figure 2:
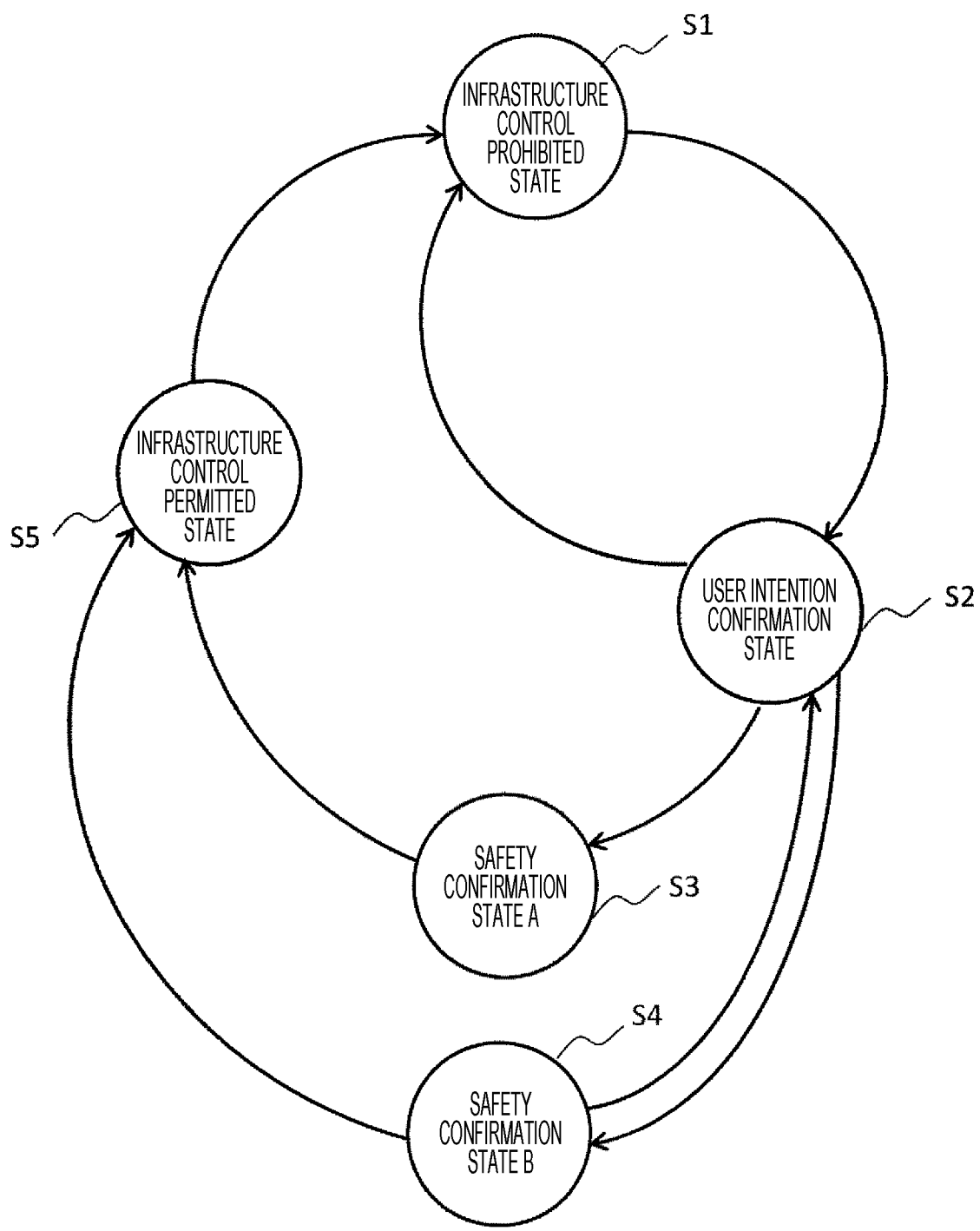
FIG. 2 illustrates an example of state transition of autonomous driving control device related to control from an infrastructure.

How the state of the autonomous driving control device 130 transitions according to the embodiment of the present invention will be described with reference to FIG. 2. The vehicle 100 executes an authentication processing with the infrastructure facility 300. The autonomous driving control device 130 is in an infrastructure control prohibited state S1 during a period in which encrypted communication with the infrastructure facility 300 is not established. When the vehicle 100 performs authentication with the infrastructure facility 300 so that the encrypted communication can be performed through communication between the vehicle-side communication device 110 and the infrastructure-side communication device 310, and when the infrastructure facility 300 has a function for controlling the vehicle 100, the state transitions to a user intention confirmation state S2.

In the user intention confirmation state S2, the user 21 is notified that the infrastructure facility 300 can control the vehicle 100, and it is checked whether the user 21 is willing to permit the control by the infrastructure facility 300. If the user 21 does not permit the control, the state transitions to the infrastructure control prohibited state S1.

When the user 21 selects permit in the user intention confirmation state S2 and the user authentication device 180 confirms that the authorized user is in the vehicle 100, the state transitions to a safety confirmation state A (S3). The state does not transition from the user intention confirmation state S2 unless it can be confirmed that the authorized user is in the vehicle.

In the case that whether the authorized user is in the vehicle is determined by the user authentication device 180 by using the user terminal 400, the determination is made by checking whether the user terminal 400 is in the vehicle. When biometric authentication is used instead of the user terminal 400, it is determined that the authorized user when the driver has continued to be seated in the driver's seat after the previous authentication. However, even when a seated user is detected, presence of even a single seating undetected period results in determination that whether the authorized user is seated is unknown. When an operation requiring the user authentication is performed in a state that the user 21 is detected to be seated but it is determined that whether the authorized user is seated is unknown, a request for reauthentication is issued to the user 21 using the touch panel display 600 and sound, and the authorized user is determined to be in the vehicle after the successful authentication.

When the user 21 gets off the vehicle 100 in the user intention confirmation state S2 without selecting not permit or permit in the user intention confirmation state S2, the state transitions to a safety confirmation state B (S4). When the user 21 gets on the vehicle 100 again in the safety confirmation state B (S4), the state returns to the user intention confirmation state (S2).

When, in the safety confirmation state A (S3), all passengers get off and a locking operation for the vehicle 100 (an operation such as touching a specific part near the door knob of the vehicle 100 while holding the user terminal 400 or a locking operation involving biometric authentication such as touching the fingerprint authentication part) or an operation of pressing the park button 430 on the user terminal 400 is performed, the doors of the vehicle 100 are locked, safety around the vehicle 100 is confirmed, and then the state transitions to an infrastructure control permitted state S5.

When, in the safety confirmation state B (S4), all the passengers get off the vehicle, the information indicating that the parking start button on the user terminal 400 is transmitted via the user authentication device 180, and the safety around the vehicle 100 is successfully confirmed, the state transitions to the infrastructure control permitted state S5. Thus, based on an operation on the park button 430 of the user terminal 400 corresponding to the key of the vehicle 100, it is determined that the user 21 has determined to permit the infrastructure facility 300 to control the vehicle 100.

In the safety confirmation state B (S4), the user 21 may perform a locking operation for the vehicle 100 (an operation such as touching a specific part near the door knob of the vehicle 100 while holding the user terminal 400 or a locking operation involving biometric authentication such as touching the fingerprint authentication part) without knowing that the infrastructure facility 300 is requiring the permission to control the vehicle 100. Thus, the vehicle 100 issues warning to the user 21 by sound, a hazard lamp, and the like. Thereafter, when it is detected that the locking operation has been performed again for a long time (about 2 seconds) and the safety around the vehicle 100 is successfully confirmed, the state transitions to the infrastructure control permitted state S5.

In the infrastructure control permitted state S5, the vehicle 100 moves according to an instruction based on encrypted communication with the infrastructure facility 300. Thus, the autonomous driving control device 130 issues an instruction to the vehicle control device 210 to operate the vehicle 100 in accordance with an instruction input from the infrastructure facility 300 via the vehicle-side communication device 110.

The infrastructure control permitted state S5 transitions to the infrastructure control prohibited state S1 when the vehicle 100 exits the infrastructure facility management region 301. In addition, the transition to the infrastructure control prohibited state S1 occurs also when a possibility of occurrence of a security problem due to reception of abnormality for several times within a second in communication with the infrastructure facility 300 and when it is determined that some sort of abnormality has occurred on the side of the infrastructure facility 300 indicated by an instruction for moving out from the parking lot. When the door is not locked or when the user 21 is in the vehicle, the instruction from the infrastructure facility 300 to the vehicle 100 is temporarily prohibited even in the infrastructure control permitted state S5.

In addition, when biometric authentication is used without using the user terminal 400, the authentication may include recognition of the iris of an eye using a camera at a timing when the authentication is required, in addition to fingerprint authentication, finger vein authentication, and the like involving direct touching on the sensor.

Figure 3:
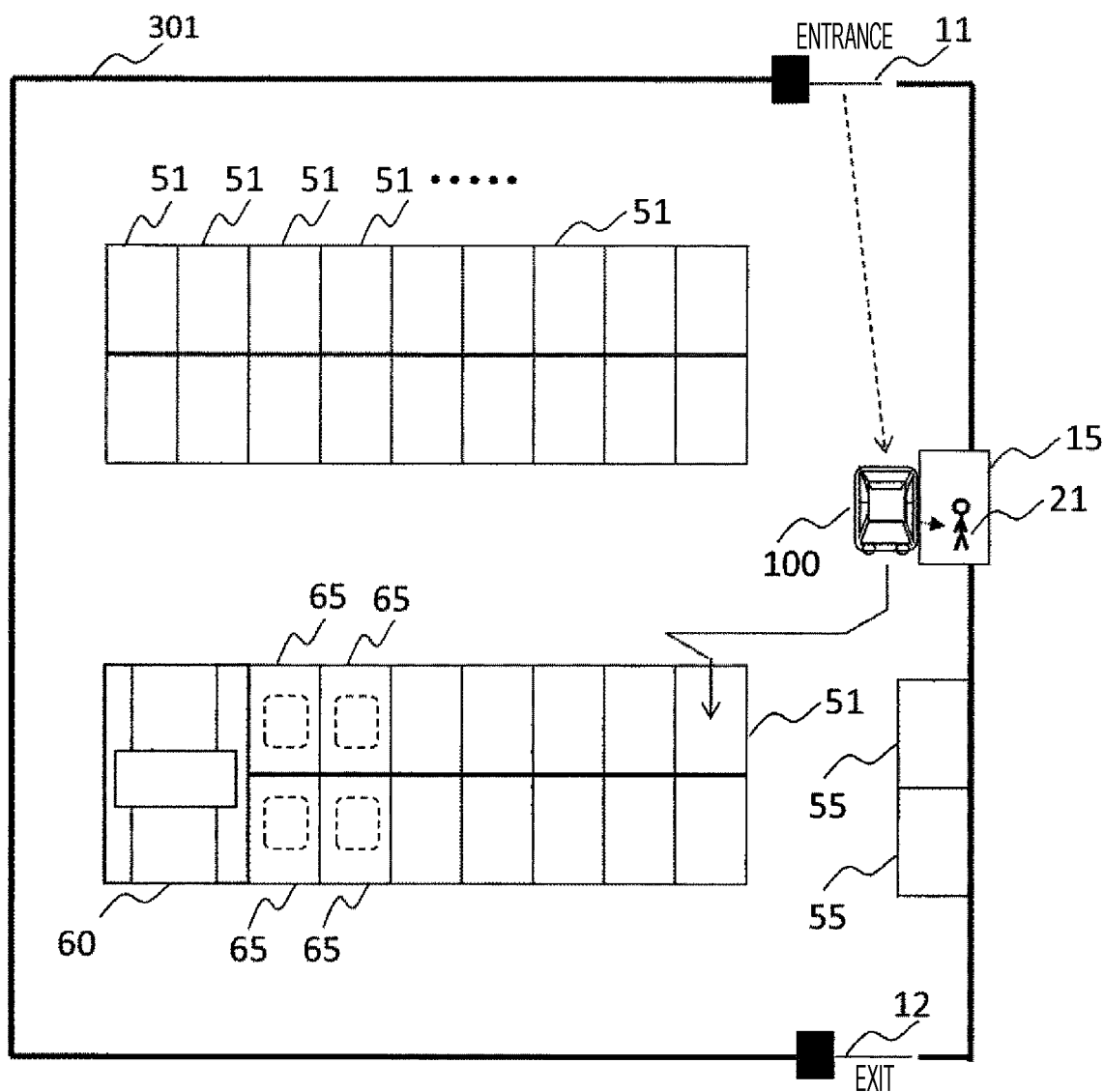
FIG. 3 illustrates an example of movement of a vehicle and a user of the vehicle in an infrastructure facility management region at the time of loading.
Figure 4:
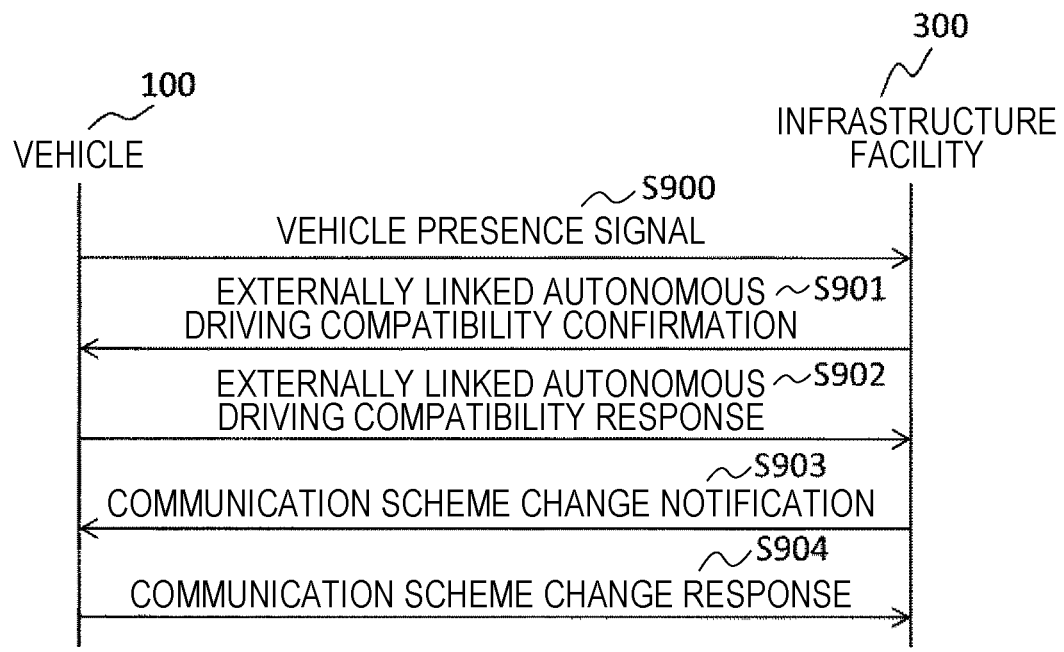
FIG. 4 illustrates an example of a communication procedure between the infrastructure facility and the vehicle at an entrance gate.
Figure 5:
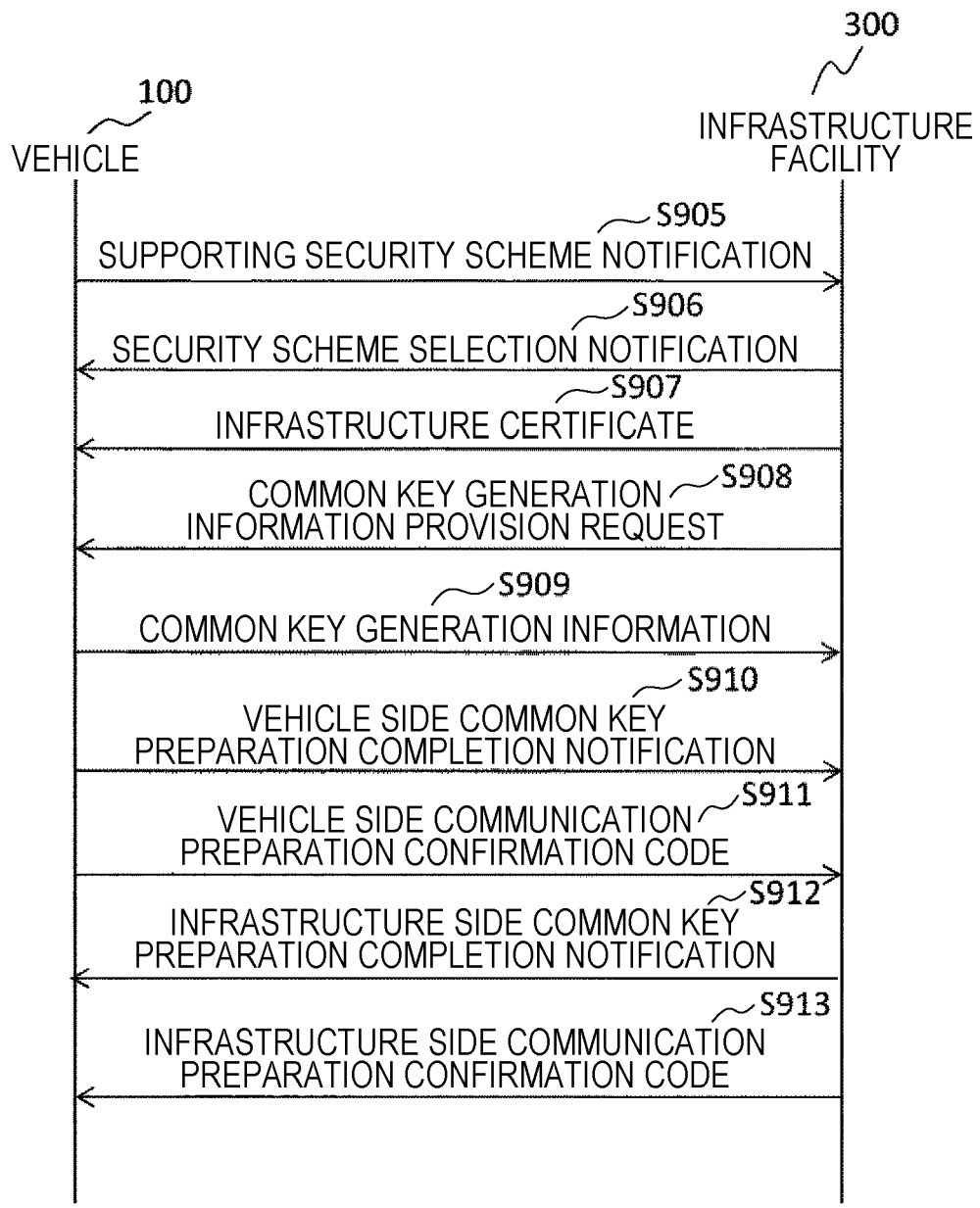
FIG. 5 illustrates an example of a communication procedure for establishing secure communication between the infrastructure facility and the vehicle.
Figure 6:
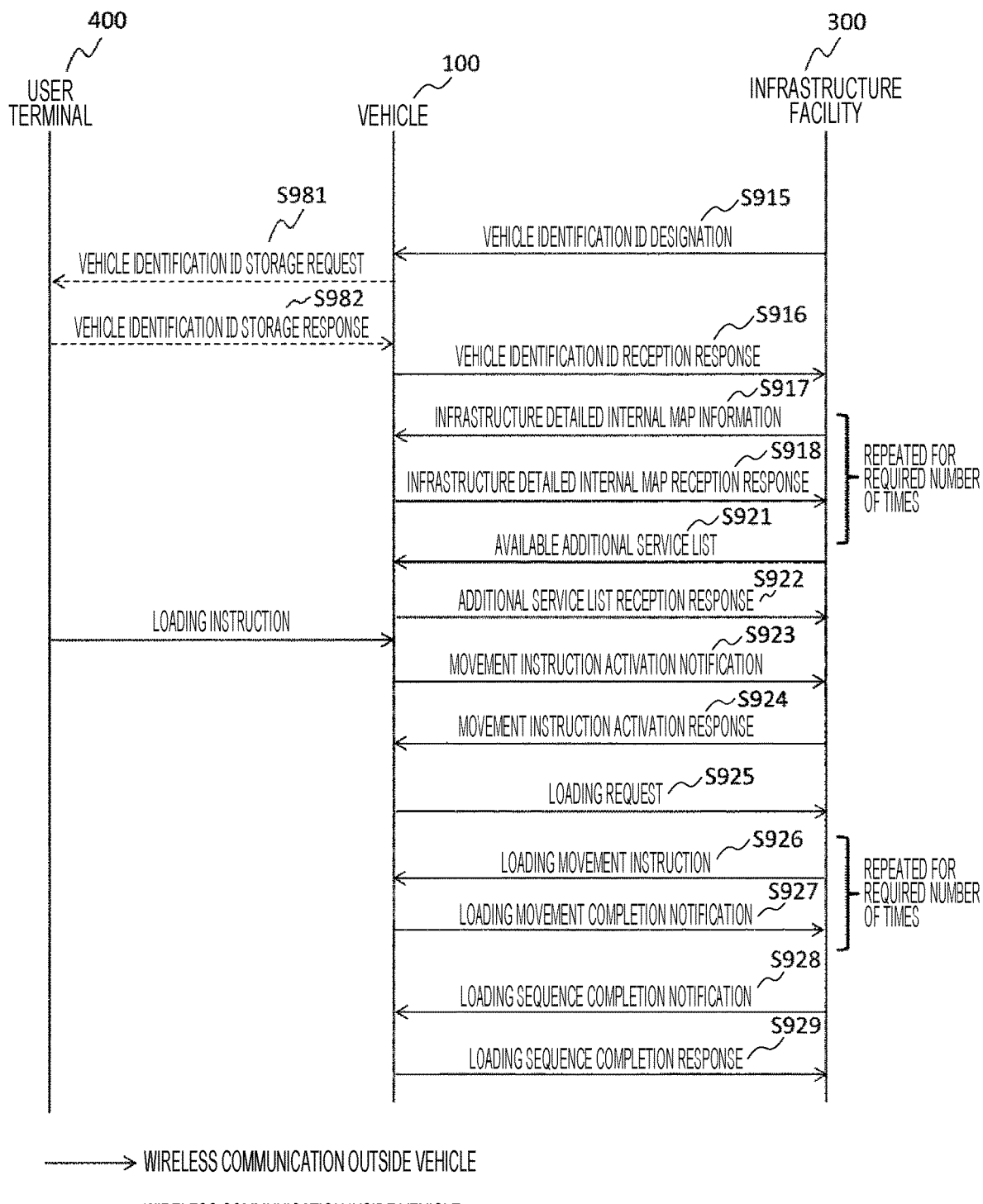
FIG. 6 illustrates an example of a communication procedure among a user terminal, the vehicle, and the infrastructure facility at the time of loading.
Figure 7:
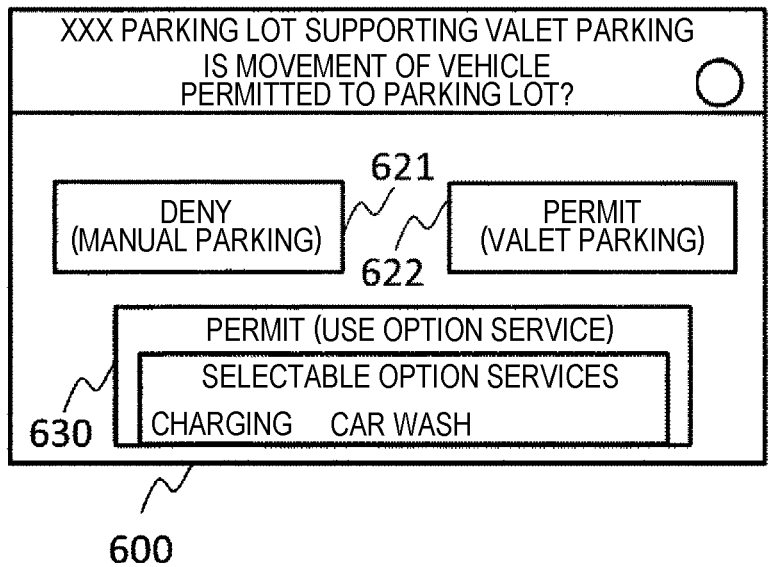
FIG. 7 illustrates an example of display on a touch panel display for confirming the user whether to permit the infrastructure facility to control the vehicle.
Figure 8:
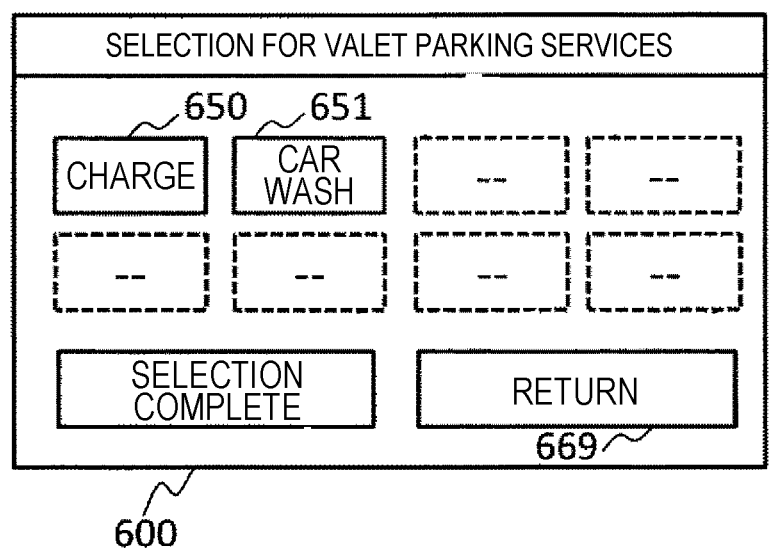
FIG. 8 illustrates an example of display on the touch panel display for confirming the user whether to use an option service provided by the infrastructure facility.

An operation at the time of loading the vehicle 100 will be described with reference to FIGS. 3 to 9. FIG. 3 illustrates how the vehicle 100 moves in the infrastructure facility management region 301. FIG. 4 illustrates a communication procedure for the infrastructure facility 300 to detect the vehicle 100 and establish initial communication when the vehicle 100 enters the infrastructure facility management region 301. FIG. 5 illustrates a communication procedure for establishing secure communication using the encryption, between the infrastructure facility 300 and the vehicle 100. FIG. 6 illustrates a communication procedure among the vehicle 100, the user terminal 400, and the infrastructure facility 300 until the vehicle 100 is parked in any of parking frames 51 after the secure communication has been established. FIG. 7 illustrates an example of contents displayed on the touch panel display 600 when the vehicle 100 confirms whether the user 21 is willing to permit the control by the infrastructure facility 300. FIG. 8 illustrates an example of contents displayed on the touch panel display 600 when the user 21 of the vehicle 100 selects a service provided by the infrastructure facility 300. FIG. 9 illustrates an example of the user terminal 400.

When the vehicle 100 passes through the entrance gate 11 when entering the infrastructure facility management region 301.

At this time, information required for the infrastructure facility 300 to communicate individually with each vehicle 100 is performed between the infrastructure facility 300 and the vehicle 100 by the communication procedure illustrated in FIG. 4. For this communication, a communication scheme, such as dedicated short range communications, is employed with which communication can be performed with vehicles 100 distinguished from each other even in a state where no information has been exchanged between the vehicles 100 and the infrastructure facility 300 yet. With each vehicle 100 identified by the infrastructure facility 300, the infrastructure facility 300 can thereafter select each vehicle 100 in the infrastructure facility management region 301 and issue an instruction to the vehicle 100.

When the vehicle passes through the entrance gate 11, a parking ticket is issued as necessary. In this parking ticket, information necessary for identifying the target vehicle when the vehicle 100 is called at the time of exiting (vehicle identification code allocated by the infrastructure facility 300) is included and recorded. The parking ticket may not be issued when the user 21 of the vehicle 100 can record information necessary for calling the vehicle 100 to a device he or she carries while he or she is away from the vehicle 100, such as the user terminal 400 for example. Furthermore, the parking ticket may not be issued when the call operation for the vehicle 100 can be activated by accessing the vehicle 100 from a smartphone or the like carried by the user 21, and when the information required for calling the vehicle 100 can be recorded by the vehicle 100.

In the communication procedure shown in FIG. 4, upon receiving communication scheme change notification S903, the vehicle 100 establishes a communication path using the communication scheme designated by the received content, and also checks whether the security of the communication path can be guaranteed at this timing. The infrastructure facility 300 is notified of a result of establishing the communication path, with a communication scheme change response S904.

For example, in order to change the communication scheme to a wireless LAN and establish secure encrypted communication, a communication procedure as illustrated in FIG. 5 is performed to exchange information necessary for the encrypted communication.

After the communication procedure of FIG. 4 has been completed, the vehicle 100 moves to a platform 15 in the infrastructure facility management region 301, based on a driving operation of the user 21 of the vehicle 100. Furthermore, the communication procedure illustrated in FIG. 6 is initiated, information up to an additional service list reception response S922 is communicated before the user 21 of the vehicle 100 gets off.

With vehicle identification ID designation S915, a vehicle identification code, used by the infrastructure facility 300 for managing the vehicle 100 is transmitted to the vehicle 100 together with an error detection code.

Upon receiving the vehicle identification code, the vehicle 100 stores it if there is no error in the vehicle identification code. When an error is detected, the transmission is retried, through transmission of a retransmission request from the vehicle 100 to the infrastructure facility 100, until a predetermined number of times is reached.

Upon properly receiving the vehicle identification code that can be stored with the user terminal 400 being in the vehicle, the vehicle 100 transmits a vehicle identification ID storage request S981 to the user terminal 400 together with the vehicle identification code and its error detection code. When the vehicle identification code has no error, the user terminal 400 stores it as a valid vehicle identification code. When an error is detected, the transmission is retried, through transmission of a retransmission request to the vehicle 100, until a predetermined number of times is reached. Upon properly completing the storage processing, the user terminal 400 transmits a vehicle identification ID storage response S982 to the vehicle.

When the vehicle identification ID storage response S982 is received from the user terminal 400, or when communication is not performed with the user terminal 400, the vehicle 100 transmits a vehicle identification ID reception response S916 to the infrastructure facility 300 upon receiving the vehicle identification ID designation S915.

With the vehicle identification code stored in the user terminal 400, the infrastructure facility 300 can identify the vehicle 100 as the unloading target, when a user terminal touch portion 770 of the payment device 700 of the infrastructure facility 300 is touched with the user terminal 400 at the time of unloading. Thus, issuing of the parking ticket of the infrastructure facility 300 for identifying the unloading target vehicle and reception of the parking ticket by the user 21 can be omitted, whereby convenience at the time of loading can be improved.

When the vehicle identification code stored in the user terminal 400 is used for calling the vehicle at the time of unloading, there is a risk that a third party may acquire the code and call the vehicle. However, even in such a case, the unlocking of the vehicle 100 can be prevented, due to the authentication function of the vehicle 100 used when a person attempts to get on the vehicle. However, considering the fact that unnecessary movement of the vehicle 100 occurs, secure encrypted communication is preferably performed for the vehicle identification ID storage request S981 and the vehicle identification ID storage response S982. Furthermore, encrypted communication should be used for near field communication with the user terminal 700, occurring when the payment device 700 is touched. However, the communication range is limited to an area inside the vehicle when the vehicle identification code is written from the vehicle 100 to the user terminal 400. Furthermore, near field radio is employed when the payment device 700 is touched. Thus, when the encrypted communication is used, a simple encryption with a low security level may be used for the sake of simplification of the user terminal 400. In such a case, a measure needs to be taken such as disabling a user of the infrastructure facility 300 to perform automatic payment.

After the communication related to the vehicle identification code, the infrastructure facility 300 transmits infrastructure detailed internal map information S917, including the detailed map information of the infrastructure facility management region 301, to the vehicle 100. This information is stored in the map information management device 150 of the vehicle 100, and is referred to when the vehicle 100 is moved in the infrastructure facility management region 301 by the function of the autonomous driving control device 130.

Upon properly receiving the infrastructure detailed internal map information S917, the vehicle 100 transmits an infrastructure detailed internal map reception response S918 to the infrastructure facility 300. If there is an abnormality in communication, a retransmission request is transmitted to the infrastructure facility 300, and information acquisition is retried until a predetermined number of times is reached.

Next, the infrastructure facility 300 transmits an available additional service list S921 to the vehicle 100. Upon properly receiving the list, the vehicle 100 transmits an additional service list reception response S922 to the infrastructure facility 300. If there is an abnormality in communication, a retransmission request is transmitted to the infrastructure facility 300, and information acquisition is retried until a predetermined number of times is reached.

When the communication up to S922 is completed, the state transitions to the user intention confirmation state S2, and based on the information acquired from the infrastructure facility 300 via the vehicle-side communication device 110, the autonomous driving control device 130 displays a message and a selection screen as illustrated in FIG. 7 on the touch panel display 600 via the user interface control device 190. From this display, the user 21 of the vehicle 100 can realize that the infrastructure facility 300 is requesting for the authority to control the vehicle 100, and can also recognize the service provided by the infrastructure facility 300.

When the user 21 of the vehicle 100 selects a "deny" button 621 for the message displayed on the touch panel display 600, the autonomous driving control device 130 returns to the infrastructure control prohibited state S1, and the control of the vehicle 100 by the infrastructure facility 300 is inactivated.

When the user 21 selects a "permit" button 622, the state transitions to the safety confirmation state A, after the autonomous driving control device 130 confirms that the selection has been made by the authorized user by checking whether the user terminal 400 is in the vehicle (S3). When it cannot be confirmed that the operation has been made by the authorized user, the user 21 is prompt to perform an operation necessary for user authentication with a message such as "Please put the user terminal in the vehicle" and the state is maintained to be the user intention confirmation state S2.

When the user 21 of the vehicle 100 selects a "permit (use option service)" button 630, the autonomous driving control device 130 displays a message illustrated in FIG. 8 on the touch panel display 600 upon confirming that the selection operation can be regarded as being performed by the authorized user, to prompt the user 21 to select an option service.

When the user 21 selects a "return" button 669 on the option selection screen, the screen returns to the state of displaying the previous screen (screen as illustrated in FIG. 7).

When the user 21 selects a use option such as a "charge" button 650 and a "car wash" button 651 on the option selection screen and then selects a "selection complete" button 600, the autonomous driving control device 130 transitions to the safety confirmation state A (S3).

When the user 21 gets off the vehicle 100 before the operation for the messages illustrated in FIGS. 6 and 8 is completed, the autonomous driving control device 130 transitions to the safety confirmation state B (S4). When the user 21 gets on the vehicle 100 again in this state, the autonomous driving control device 130 returns to the user intention confirmation state S2 and causes the user 21 to continue operating the touch panel display.

When the autonomous driving control device 130 in the safety confirmation state A (S3) is notified that the door is locked by a direct operation on the vehicle 100 such as touching a specific part of the vehicle 100 by the user 21, the autonomous driving control device 130 uses a seating sensor and the like to confirm that all the passengers have gotten off the vehicle 100 and uses an external sensor 170 to confirm that there is no obstacle around the vehicle 100, and then transitions to the infrastructure control permitted state S5.

Also when the "park" button 430 of the user terminal 400 is pressed while the autonomous driving control device 130 is in the safety confirmation state A (S3), the door of the vehicle 100 is locked and the autonomous driving control device 130 is notified of the fact that the door lock is properly performed by using the "park" button 430. Then, the autonomous driving control device 130 uses a seating sensor and the like to confirm that all the passengers have gotten off the vehicle 100 and uses the external sensor 170 to confirm that there is no obstacle around the vehicle 100, and then transitions to the infrastructure control permitted state S5.

The autonomous driving control device 130 also locks the door of the vehicle 100 when the "lock" 410 button of the user terminal 400 is pressed in the safety confirmation state A (S3). When the autonomous driving control device 130 is notified of the fact that the door lock is properly performed in response to the "lock" 410 button, the autonomous driving control device 130 prompts the user to press the "park" button 430 by instructing other control devices in the vehicle 100 to perform an operation of drawing attention using sound, hazard lamp, and the like, and waits for the "park" button 430 to be pressed. Then, when the autonomous driving control device 130 is notified that the "park" button 430 has been pressed, the autonomous driving control device 130 confirms that all the passengers have gotten off the vehicle 100 and uses the external sensor 170 to confirm that there is no obstacle around the vehicle 100, and then transitions to the infrastructure control permitted state S5.

When the autonomous driving control device 130 in the safety confirmation state B (S4) is notified that the door is locked by a direct operation on the vehicle 100 such as touching a specific part of the vehicle 100 by the user 21, the autonomous driving control device 130 instructs the other control devices in the vehicle 100 to perform the operation of drawing attention using sound, hazard lamp, and the like. Then, when a long door locking operation is performed again through a direct operation on the vehicle 100 and the autonomous driving control device 130 is notified that the operation has been performed, the autonomous driving control device 130 confirms that all the passengers have gotten off the vehicle 100 and uses the external sensor 170 to confirm that there is no obstacle around the vehicle 100, and then transitions to the infrastructure control permitted state S5.

The operations performed when the "park" button 430 and the "lock" button 410 of the user terminal 400 is pressed while the autonomous driving control device 130 is in the safety confirmation state B (S4) are each the same as that in the case of the safety confirmation state A (S3).

The safety confirmation state B (S4) is a state where whether the user 21 has permitted the control on the vehicle 100 to the infrastructure 300 has not been confirmed yet. Thus, it is at least confirmed that the operation is performed by the authorized user for causing the transition to the infrastructure control permitted state S5. The transition to the infrastructure control permitted state S5 does not occur when this confirmation fails. In order to confirm the intention of the authorized user, the notification related to locking and parking for the autonomous driving control device 130 includes information on whether the operation has involved user authentication. Here, when the operation is performed on the user terminal 400 corresponding to the key, this operation itself serves as a proof that the authorized user has performed the operation. The direct operation on the vehicle 100 such as touching a specific part of the vehicle 100 needs to be performed with confirmation of the presence of the user terminal 400 in the vicinity of the operation location or biometric authentication at the time of operation. Still, even when authentication for an authorized user is performed, for an operation, such as touching a certain part of the vehicle 100, with which the user 21 cannot clearly know whether his or her operation serves as a permission for the infrastructure facility 300 to control the vehicle 100, a measure needs to be taken such as requesting for an operation corresponding to reconfirmation.

In any case, if it cannot be confirmed that all the passengers have gotten off when attempting to transition to the infrastructure control permitted state S5, the autonomous driving control device 130 instructs the other control devices in the vehicle 100 to operate to draw attentions using sounds and hazard lamps, for inducing the passengers to get off without transitioning to the infrastructure control permitted state S5. In addition, if any of the doors of the vehicle 100 is not completely closed or if the user terminal 400 is in the vehicle, even when a door lock operation (regardless of whether it is the direct operation such as touching a specific part of the vehicle 100 or the operation using the user terminal 400) is performed, the door lock is not performed, and a sound or a hazard lamp is used to alert the user 21.

When the autonomous driving control device 130 transitions to the infrastructure control permitted state S5, the vehicle 100 transmits a movement instruction activation notification S923 to the infrastructure facility 300. In response to this, the infrastructure facility 300 returns a movement instruction activation response S924 to the vehicle 100. When the communication between the vehicle 100 and the infrastructure facility 300 up to this point is completed, the vehicle 100 can be controlled, that is, moved according to the instruction from the infrastructure facility 300.

When the vehicle 100 transmits a loading request S925 to the infrastructure facility 300 after becoming controllable by the infrastructure facility 300, the infrastructure facility 300 determines the parking frame 51 in which the vehicle 100 is to be parked, and roughly determines a movement route (roadway to be used) to reach the parking frame 51. In order to move the vehicle 100 based on this determination, a loading movement instruction S926 including information about the movement route and the destination is transmitted from the infrastructure facility 300 to the vehicle 100. The vehicle 100 that has received loading movement instruction S926 confirms that there is no abnormality in communication, and then the automatic driving control device 130 instructs the vehicle control device 210 to make the vehicle 100 operate in accordance with the instruction. When a communication abnormality is detected, a retransmission request is transmitted to the infrastructure facility 300, and the communication is retried for a predetermined number of times.

Upon completing the movement to the position given in instruction by the loading movement instruction S926 by the function of the autonomous driving control device 130, the vehicle 100 transmits a loading movement completion notification S927 to the infrastructure facility 300.

If an additional movement is required for the parking, the infrastructure facility 300 transmits the loading movement instruction S926 to the vehicle 100 again. Thus, the communication procedure involving the loading movement instruction S926 and the loading movement completion notification S927 is repeated for a required number of times. The loading movement instruction that can be issued for a plurality of times provides an advantage that the movement route of each vehicle 100 can be updated as appropriate, in accordance with the level of congestion of the roadway due to the actual movement status of the vehicles 100 and the like, in a situation where a plurality of vehicles 100 are concurrently moved in the infrastructure facility management region 301. For example, when the vehicle 100 is moved to the parking frame 51, an instruction for movement up to a point of switching back may be issued first, and then the loading movement instruction S926 for the movement to the parking frame 51 may be issued again at a timing determined while taking the movement of the other vehicles into consideration.

When the vehicle 100 moves, the automatic driving control device 130 uses the external sensor 170 to check the surroundings of the vehicle 100 and constantly monitor whether there is any risk factor for the movement such as obstacles. When the risk is found, deceleration, stopping, small changes in the route, and the like are performed to avert the risk. The risk aversion operation is performed with a priority over the instruction from the infrastructure facility 300.

When the user 21 uses the option service provided by the infrastructure facility 300, the infrastructure facility 300 plans the time allocation of the location and equipment used for the optional service. If the service allocated is immediately available upon loading, the infrastructure facility 300 determines a movement route to a service providing location (such as a charging parking frame 65 when the serving is charging and a carwash section 60 when the serving is car wash) instead of that to the normal parking frame 51, and issues an instruction to the vehicle 100.

When the movement of the vehicle 100 required for parking is completed, the infrastructure facility 300 transmits a loading sequence completion notification S928 to the vehicle 100, and in response to this, the vehicle 100 transmits a loading sequence completion response S929 to the infrastructure facility 300.

After transmitting the loading sequence completion response S929, the vehicle 100 sets the power train 230 to be in a state corresponding to parking, stops the power source 220 (in the case of a motor, stops the main power supply of the drive circuit), and sets the brake device 240 to the parking state. Then, the vehicle 100 waits for the next instruction from the infrastructure facility 300.

Note that the communication procedure for establishing secure communication between the vehicle 100 and the infrastructure facility 300 illustrated in FIG. 5 may be implemented by dedicated short range communications. In this case, the communication procedure from the communication scheme change notification S903 to the communication scheme change response S904, illustrated in FIG. 4, is implemented after the communication procedure illustrated in FIG. 5 is completed, with information required for encrypted communication, such as a key used for encryption, maintained after the communication scheme has been changed.

Figure 10:
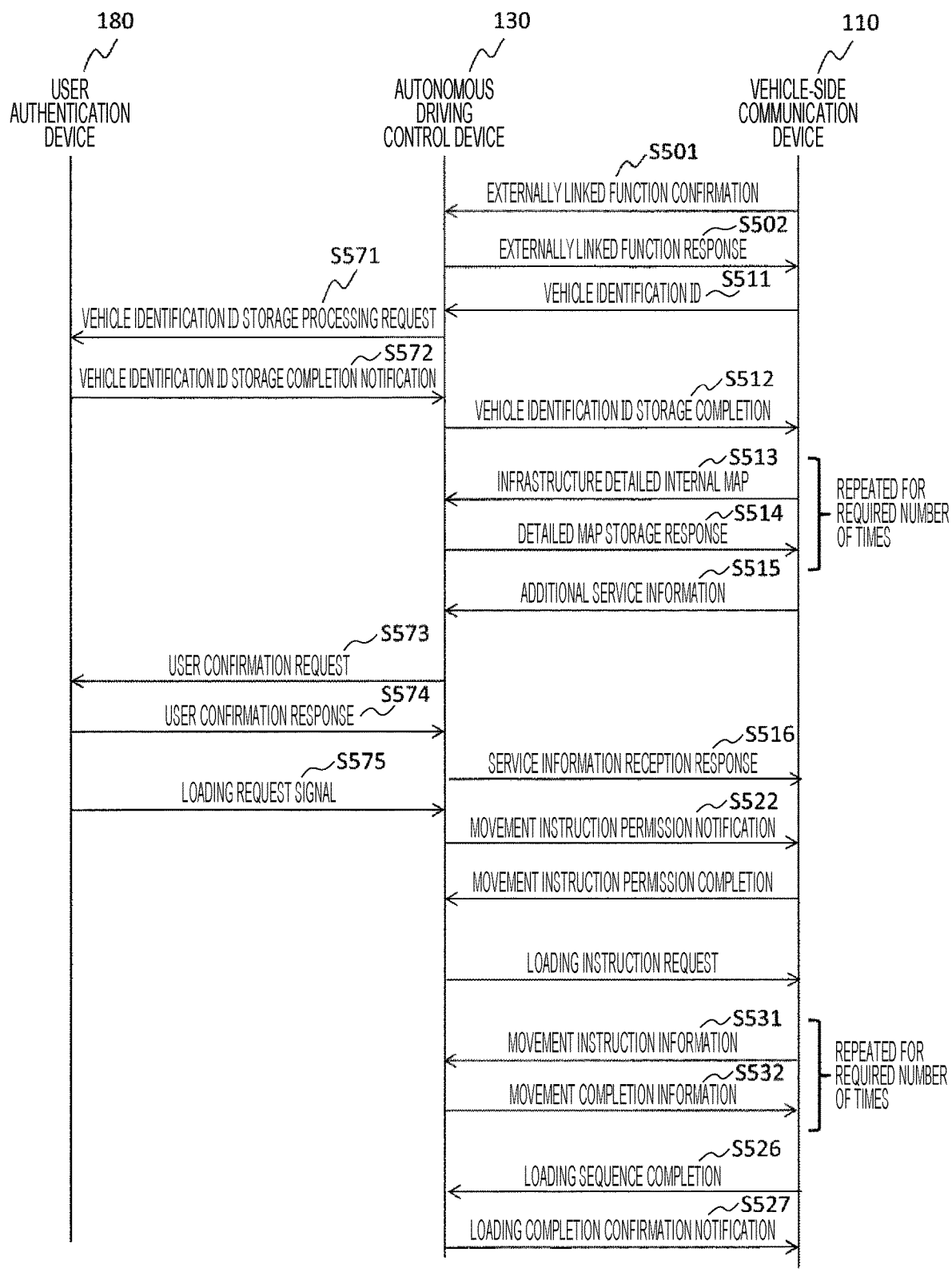
FIG. 10 illustrates an example of a communication procedure among a user authentication device, an autonomous driving control device, and a vehicle-side communication device at the time of loading.

In association with the communication procedures illustrated in FIGS. 4 and 5 between the vehicle 100 and the infrastructure facility 300 and the communication procedure illustrated in FIG. 6 among the vehicle 100, the infrastructure facility 300, and the user terminal 400, a description with reference to FIG. 10 will be given using a signal communication procedure among the autonomous driving control device 130, the user authentication device 180, and the vehicle-side communication device 110 in the vehicle 100.

When the vehicle 100 communicates with the infrastructure facility 300 and the user terminal 400, the infrastructure facility 300 communicates with the vehicle-side communication device 110 mounted on the vehicle 100, and the user terminal 400 communicates with the user authentication device 180 mounted on the vehicle 100.

When the infrastructure facility 300 communicates with the vehicle 100, the infrastructure facility 310 uses the infrastructure-side communication device 310.

The infrastructure facility 300 receives a vehicle presence signal S900 transmitted from the vehicle-side communication device 110 and transmits an externally linked autonomous driving compatibility confirmation S901 to the vehicle-side communication device 110 as a response. Then, the vehicle-side communication device 110 that has received the externally linked autonomous driving compatibility confirmation S901 transmits an externally linked function confirmation S501 to the autonomous driving control device 130. The autonomous driving control device 130 that has received the externally linked function confirmation S501 transmits, as a response, an externally linked function response S502, including information about a function linked with the outside of the vehicle 100, to the vehicle-side communication device 110. The vehicle-side communication device 110 transmits an externally linked autonomous driving compatibility response S902, including information corresponding to the information about the function linked with the outside thus received, to the infrastructure facility 300.

Upon determining that the infrastructure facility 300 has a function for controlling movement from the outside of the vehicle 100 based on the content of the externally linked autonomous driving compatibility response S902, the infrastructure facility 300 transmits to the vehicle-side communication device 110, the communication scheme change notification S903 for stablishing the communication path with which the infrastructure facility 300 gives an instruction on the movement of the vehicle 100. This notification also serves as a request for acquiring the authority to control the vehicle 100. At this time, the type of communication path as a result of the change and information required for communication are included. For example, when a wireless LAN is used, this information includes a frequency band to be used, an SSID required for using the wireless LAN, and authentication information for wireless LAN connection.

Upon receiving the communication scheme change notification S903, the vehicle-side communication device 110 confirms whether the communication connection is established with the designated communication scheme. Upon confirming the establishment, the vehicle-side communication device 110 transmits the communication scheme change response S904 to the infrastructure facility 300 as a response. When the connection with the designated communication path fails, information indicating the failure is transmitted to the infrastructure facility 300. If there is an alternative communication scheme, the communication scheme change notification S903 is sent again with such a scheme designated, to the vehicle 100. Thus, an attempt to establish the communication path is repeated. If there is no communication scheme available, the infrastructure facility 300 abandons the acquisition of the authority to control the vehicle 100 and notifies the vehicle-side communication device 110 of such decision. Upon receiving this notification, the vehicle-side communication device 110 notifies the autonomous driving control notification 130 of the decision, and the autonomous driving control device 130 abandons provision of the authority to control the vehicle 100 to the infrastructure facility 300.

When the communication path for the infrastructure facility 300 to instruct the vehicle 100 to move is established, communication is performed in accordance with the communication procedure shown in illustrated in FIG. 5 to establish secure communication between the vehicle-side communication device 110 and the infrastructure facility 300. In this process, the vehicle-side communication device 110 receives an infrastructure side electronic certificate with an infrastructure certificate S907. Then, the vehicle-side communication device 110 checks the content of the certificate against the information recorded in advance and, if necessary, makes an inquiry to an external device having a reliable communication function, using a secure communication scheme to confirm the legitimacy of the infrastructure facility 300. By confirming the legitimacy of the infrastructure facility 300, it is possible to prevent an entity other than the infrastructure facility 300 from acquiring the authority to control the vehicle 100 by pretending to be the infrastructure facility 300.

After the secure communication is achieved, encrypted communication with authentication that is the secure communication scheme is used for the communication thereafter between the vehicle 100 and the infrastructure facility 300, until the vehicle 100 is unloaded from the infrastructure facility 300.

After the secure communication is achieved, upon first receiving vehicle identification ID designation S915 transmitted from the infrastructure facility 300, the vehicle-side communication device 110 transmits a vehicle identification ID (S511) with the content including the vehicle identification code included in the content of the designation, to the autonomous driving control device 130. Upon receiving the vehicle identification ID (S911), the autonomous driving control device 130 stores the vehicle identification code, and uses a vehicle identification ID storage processing request S571 to transmit this information to the user authentication device 180.

Upon receiving the vehicle identification ID storage processing request S571, the user authentication device 180 stores the vehicle identification code therein, and also communicates with the user terminal 400 to store the vehicle identification code in the user terminal 400. Then, the user authentication device 180 confirms that the storage in the user terminal 400 is completed, and transmits a vehicle identification ID storage completion notification S572 to the autonomous driving control device 130 as a response to the vehicle identification ID storage processing request S571.

In a configuration not involving the user terminal 400, the user authentication device 180 simply stores the vehicle identification code, and then transmits the vehicle identification ID storage completion notification S572 to the autonomous driving control device 130.

Upon receiving the vehicle identification ID storage completion notification S572, the autonomous driving control device 130 transmits the vehicle identification ID storage completion S512 to the vehicle-side communication device 110 as a response to the vehicle identification ID (S511). Upon receiving the vehicle identification ID storage completion S512, the vehicle-side communication device 110 transmits a vehicle identification ID reception response S916 to the infrastructure facility 300.

Upon receiving the infrastructure detailed internal map information S917 having the map information necessary for movement in the infrastructure facility management region 301 from the infrastructure device 300, the vehicle-side communication device 110 uses the infrastructure detailed internal map S513 to transmit the content of the information to the autonomous driving control device 130. Upon receiving the content, the autonomous driving control device 130 transmits information to the map information management device 150 and the map information management device 150 manages the content as map information required for movement within the infrastructure.

Upon confirming that the map information is stored in the map information management device 150, the autonomous driving control device 130 transmits a detailed map storage response S514 to the vehicle-side communication device 110 as a response to the infrastructure detailed internal map S513. Upon receiving the detailed map storage response S514, the vehicle-side communication device 110 transmits an infrastructure detailed internal map reception response S918 to the infrastructure facility 300 as a response to the infrastructure detailed internal map information S917.

The amount of data of the infrastructure internal map information might be large. Thus, a procedure between transmission of the infrastructure detailed internal map information S917 by the infrastructure facility 300 and reception of the infrastructure detailed internal map reception response S918 may be repeated for a plurality of times for splitting and transmitting the map information. In such a case, the communication procedure from the infrastructure detailed internal map S513 to the detailed map storage response S514 may also be repeated between the vehicle-side communication device 110 and the autonomous driving control device 130. The number of repetitions between the infrastructure facility 300 and the vehicle-side communication device 110 and the number of repetitions between the vehicle side communication device 100 and the autonomous driving control device 130 may not necessarily match if the division and integration of packets and the like are performed in the vehicle-side communication device 110.

After the detailed map information about the infrastructure facility management region 301 is communicated, the infrastructure facility 300 transmits, to the vehicle-side communication device 110, the available additional service list S921 having information about additional services that can be provided by the infrastructure facility 300. Upon receiving the available additional service list S921, the vehicle-side communication device 110 transmits the information to the autonomous driving control device 130 as additional service information S515.

At this stage, the autonomous driving control device 130 makes an inquiry to the user 21, via the user interface control device 190 and the touch panel display 600, to check whether he or she accepts the control of the vehicle 100 by the infrastructure facility 300. Furthermore, a user confirmation request S573 is transmitted to the user authentication device 180 to make an inquiry for checking whether the user 21 is the authorized user of the vehicle 100, and a user confirmation response S574 is received as the confirmation result.

The user authentication device 180 confirms whether the user 21 is the authorized user in the following manner. Specifically, in a case that the user terminal 400 is used, whether the user terminal 400 is in the vehicle is confirmed. In a case that biometric authentication is used, whether there is a possibility that the user 21 has departed from the vehicle after the authentication is checked, and then the user 21 is prompt to perform an authentication operation if there is a sign of departure, to perform the authentication again.

By confirming whether the user 21 accepts control of the vehicle 100 by the infrastructure facility 300 at this stage, whether to make additional services, requiring the vehicle 100 to be movable by the infrastructure facility 300, selectable by the user 21 can be determined.

If there is an additional service that can be selected, an inquiry is made to the user 21 to check whether he or she will use the service, via the user interface control device 190 and the touch panel display 600. Thereafter, a service information reception response S516 with the content including information about a service selected by the user is transmitted to the vehicle-side communication device 110. Upon receiving the service information reception response S516, the vehicle-side communication device 110 transmits an additional service list reception response S922 including the information about the service selected by the user 21, to the infrastructure facility 300.

Based on the information about the service selected by the user 21 included in the additional service list reception response S922 received, the infrastructure facility 300 allocates usage time of a location and facility in the infrastructure facility, allocates a parking frame, and drafts a plan for the movement of the vehicle 100 in the infrastructure facility management region 301, and thus controls the movement of the vehicle 100 based on the plan and an actual vacancy status of the service providing facility.

When the user 21 performs a parking operation on the vehicle 100 by achieving a state in which the user 21 has confirmed that he or she permits the infrastructure facility 300 to control the vehicle 100 or by performing an operation corresponding to the permission for the control, the user authentication device 180 transmits a loading request signal S575 to the autonomous driving control device 130. This signal includes information indicating whether the user 21 has performed the operation corresponding to the permission for the infrastructure facility 300 to control the vehicle 100.

Upon receiving the loading request signal S575, the autonomous driving control device 130 transitions to the infrastructure control permitted state S5 regardless of whether the authentication processing is executed for the user 21 who has performed the parking operation is the authorized user when the state is the safety confirmation state A (S3). When the state is the safety confirmation state B (S4), the autonomous driving control device 130 transitions to the infrastructure control permitted state S5 after confirming that there is no passenger in the vehicle and confirming the safety around the vehicle, only when the user 21 that has performed the parking operation is successfully authenticated to be the authorized user. Then, a movement instruction permission notification S522 is transmitted to the vehicle-side communication device 110. Upon receiving the movement instruction permission notification S522, the vehicle-side communication device 110 transmits the loading request S925 to the infrastructure facility 300.

The infrastructure facility 300 that has received the loading request S925 starts a movement instruction necessary for loading the vehicle 100. Specifically, a loading movement instruction S926 including information about the destination and the movement route is transmitted. The vehicle-side communication device 110 that has received the loading movement instruction S926 transmits information about the destination and the movement route to the autonomous driving control device 130 as movement instruction information S531. The autonomous driving control device 130 that has received the moving instruction information S531 instructs the vehicle control device 210 to move the vehicle 100 in accordance with the instruction to move the vehicle 100. For the movement, map information, vehicle position information, and external sensor information are used for performing traveling speed control including movement route adjustment and stopping with the highest priority on guaranteeing safety. For example, when a risk of the movement which cannot be averted is detected, the movement is stopped until the risky state is terminated.

When the movement of the vehicle 100 to the designated location is completed, the autonomous driving control device 130 transmits a movement completion information S532, including information about the actual position at the time of movement completion, to the vehicle-side communication device 110. The vehicle-side communication device 110 that has received the movement completion information S532 transmits a loading movement completion notification S927, including the movement completion position information, to the infrastructure facility 300.

The infrastructure facility 300 that has received the loading movement completion notification S927 issues the loading movement instruction S926 again if further movement is required. The procedure from the transmission of the loading movement instruction S926 to the reception of the loading movement completion notification S927, by the infrastructure facility 300, is repeated as necessary. By repeating the procedure, communication involving a large amount of information can be split, and the infrastructure facility 300 can actively change the route and the destination in accordance with the movement status of the vehicle 100.

Upon confirming the completion of the movement of the vehicle 100 to the final destination of the parking operation, the infrastructure facility 300 transmits a loading sequence completion notification S928 to the vehicle-side communication device 110. Upon receiving the loading sequence completion notification S928, the vehicle-side communication device 110 transmits a loading sequence completion S526 to the autonomous driving control device 130. Upon receiving the loading sequence completion S526, the autonomous driving control device 130 instructs the vehicle control device 210 to put the power train 230 into a state corresponding to parking, and stops the power source 220 (in the case of a motor, stops the main power supply of the drive circuit), and puts the brake device 240 in a state corresponding to parking.

After confirming that the vehicle 100 is in the parked state, the autonomous driving control device 130 transmits a loading completion confirmation notification S527 to the vehicle-side communication device 110, and waits until a request related to the next movement instruction is received. The vehicle side communication device that has received the loading completion confirmation notification S527 transmits a loading sequence completion response S929 to the infrastructure facility 300. The infrastructure facility 300 determines that the parking processing for the vehicle 100 has been completed upon receiving the loading sequence completion response S929.

Note that the vehicle-side communication device 110 and the infrastructure facility 300 hold information such as an encryption key necessary for secure communication until the vehicle 100 is unloaded from the infrastructure facility 300.

Figure 11:
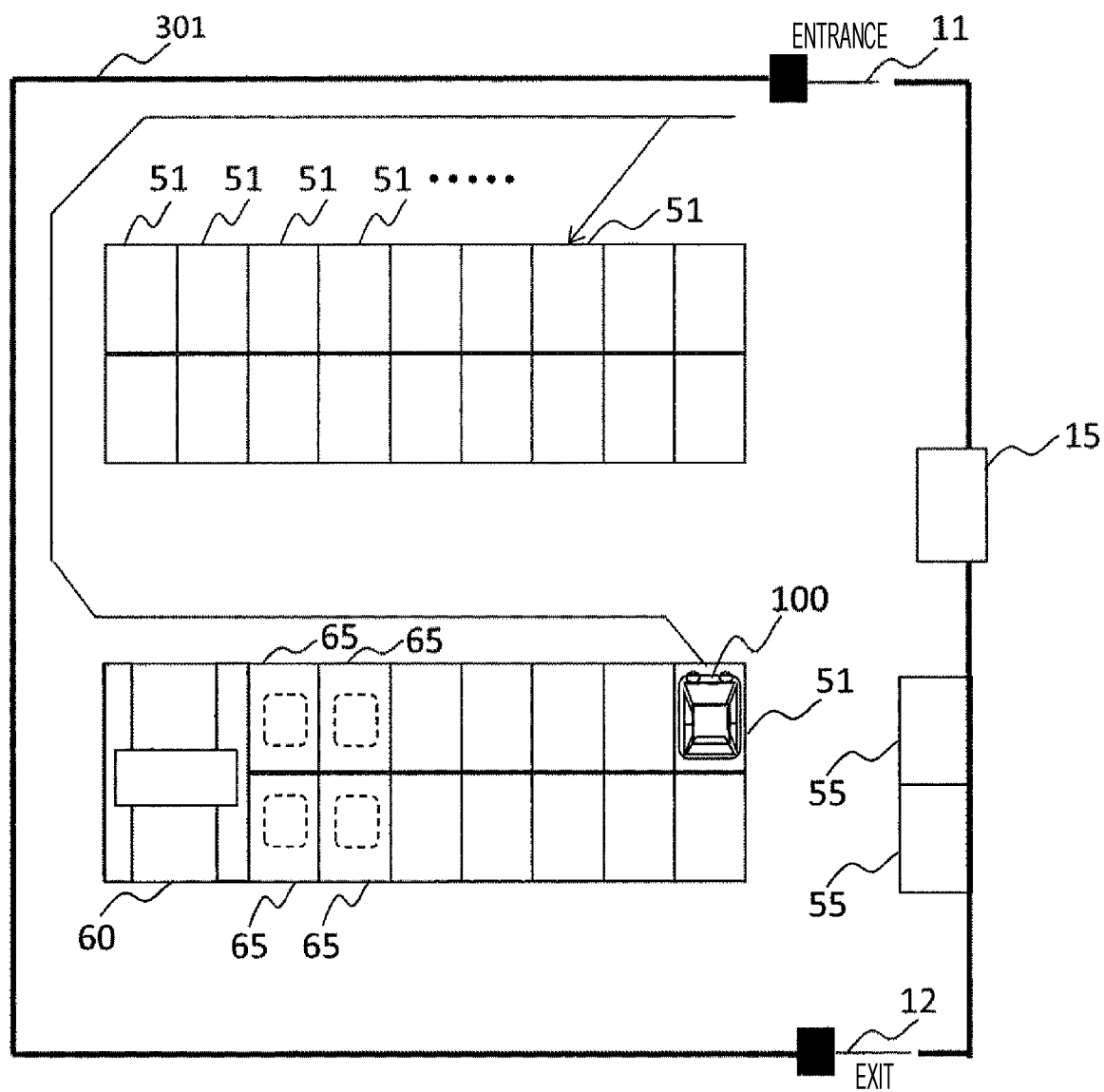
FIG. 11 illustrates an example of vehicle movement when the infrastructure facility moves a parked vehicle.
Figure 12:
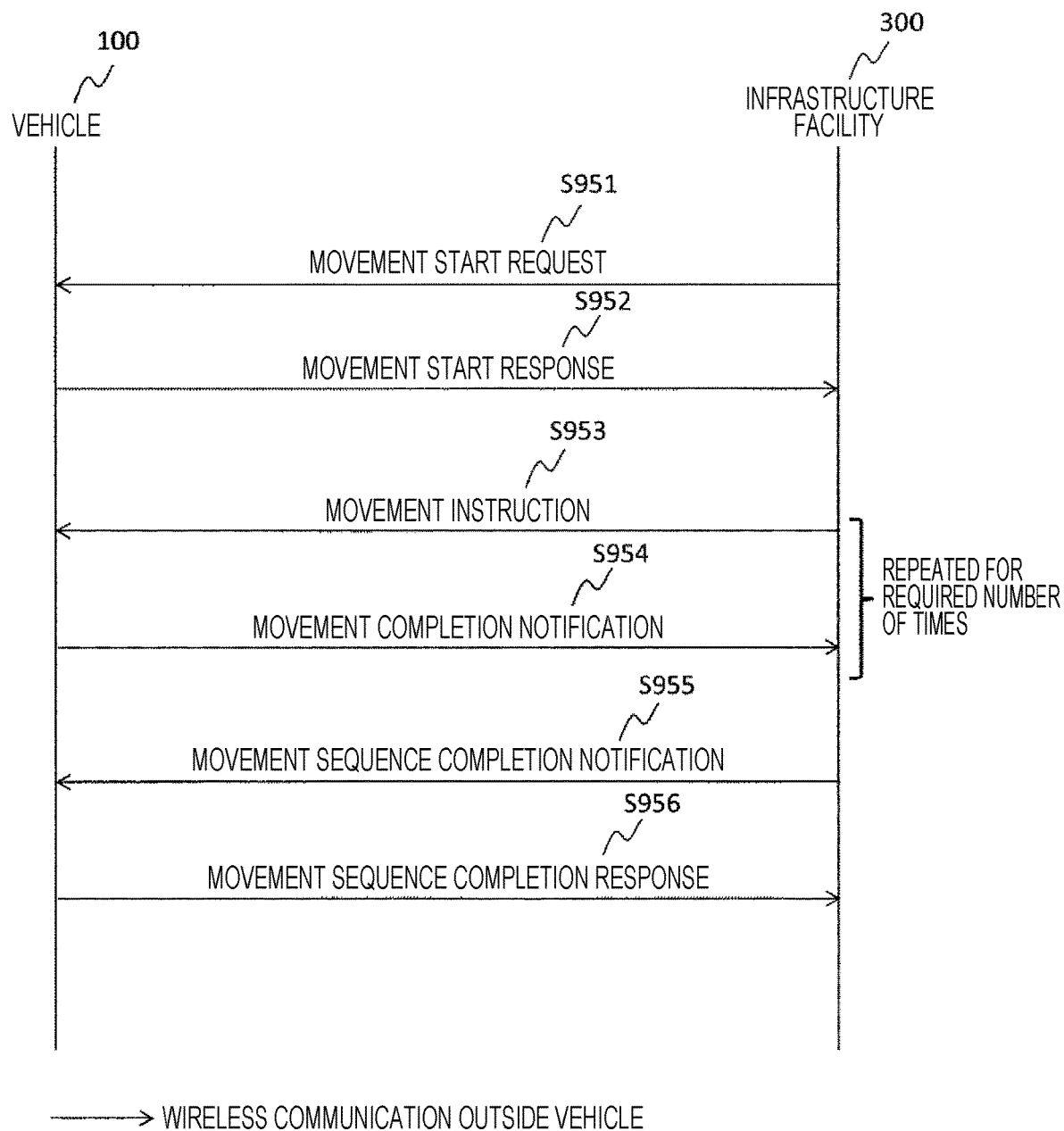
FIG. 12 illustrates an example of a communication procedure between the vehicle and the infrastructure facility when infrastructure facility moves a parked vehicle.

An operation of moving the vehicle 100 the control authority of which has been acquired by the infrastructure facility 300 from the parking state, according to the instruction of the infrastructure facility 300, will be described with reference to FIGS. 11 and 12. FIG. 11 illustrates an operation of moving the vehicle 100 from the parking frame 51 to another parking frame 51 in the infrastructure facility management region 301, and FIG. 12 illustrates the communication procedure between the vehicle 100 and the infrastructure facility 300 for such an operation. The vehicle 100 uses the vehicle-side communication device 110 therein to communicate with the infrastructure facility 300 as in the case of loading. Specifically, the vehicle-side communication device 110 communicates with the autonomous driving control device 130 as appropriate so that the autonomous driving control device 130 instructs the vehicle control device 210 to operate the vehicle 100 in accordance with the instruction from the infrastructure facility 300. Here, the vehicle 100 is operated with the highest priority on safety, also as in the case of loading.

The vehicle 100 in the parked state first receives a movement start request S951 from the infrastructure facility 300, and starts preparations for moving the vehicle 100. Specifically, when the power source 200 is stopped, the power source 220 is activated. When the power source 220 is properly activated, the vehicle 100 transmits a movement start response S952 to the infrastructure facility 300 as a response. If the power source 220 fails to be activated, information indicating the failure is sent to the infrastructure facility 300, and the infrastructure facility 300 and the vehicle 100 abandon the movement of the vehicle 100.

The infrastructure facility 300 that has received the movement start response S952 transmits a movement instruction S953 including information about the movement route and the destination. The vehicle 100 that has received movement instruction S953 confirms that there is no abnormality in communication, and then the automatic driving control device 130 instructs the vehicle control device 210 to make the vehicle 100 operate in accordance with the instruction. At this time, in the first movement, the brake device 240 is released from the parking state, and the movement is started after the power train 230 is switched to a state for movement. When a communication abnormality is detected, a retransmission request is transmitted to the infrastructure facility 300, and the communication is retried for a predetermined number of times.

Upon completing the movement to the position given in instruction by the movement instruction S953 by the function of the autonomous driving control device 130, the vehicle 100 transmits a movement completion notification S954 to the infrastructure facility 300.

If an additional movement is required, the infrastructure facility 300 transmits the movement instruction S953 to the vehicle 100 again. Thus, the communication procedure involving the movement instruction S953 and the movement completion notification S954 is repeated for a required number of times.

When the movement of the vehicle 100 is completed, the infrastructure facility 300 transmits a movement sequence completion notification S955 to the vehicle 100. Then, the vehicle 100 sets the power train 230 to be in a state corresponding to parking, stops the power source 220 (in the case of a motor, stops the main power supply of the drive circuit), and sets the brake device 240 to the parking state. Then, the vehicle 100 transmits a movement sequence completion response S956 to the infrastructure facility 300. Thereafter, the vehicle 100 waits for a next instruction and after from the infrastructure facility 300.

An operation of unloading the vehicle 100 the control authority of which has been acquired by the infrastructure facility 300 from the parking state, according to the instruction of the infrastructure facility 300, by using the payment terminal 700 of the infrastructure facility 300 will be described with reference to FIGS. 13, 14, and 15.

Figure 13:
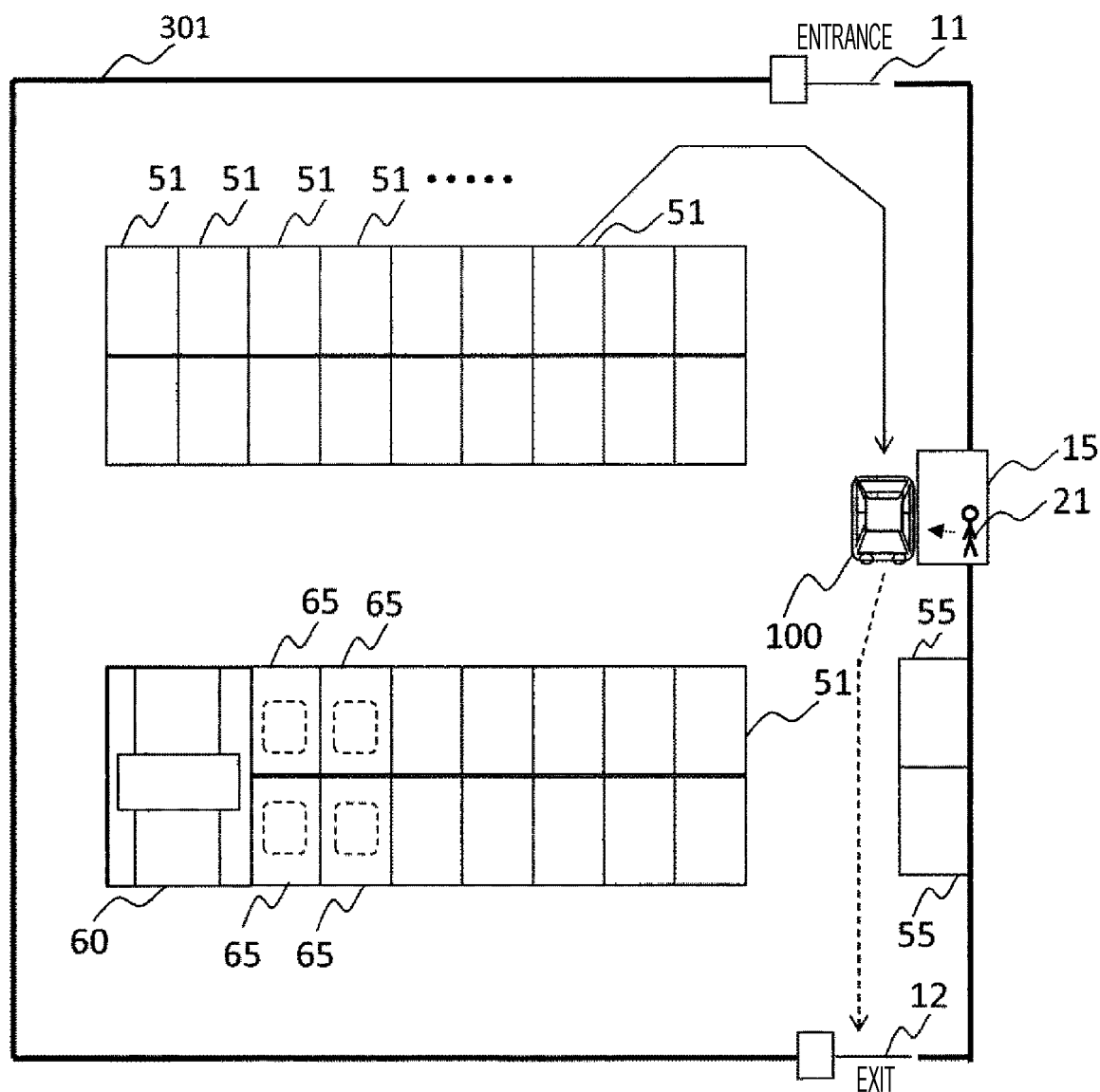
FIG. 13 illustrates an example of movement of a vehicle and a user of the vehicle in the infrastructure facility management region at the time of unloading.
Figure 14:
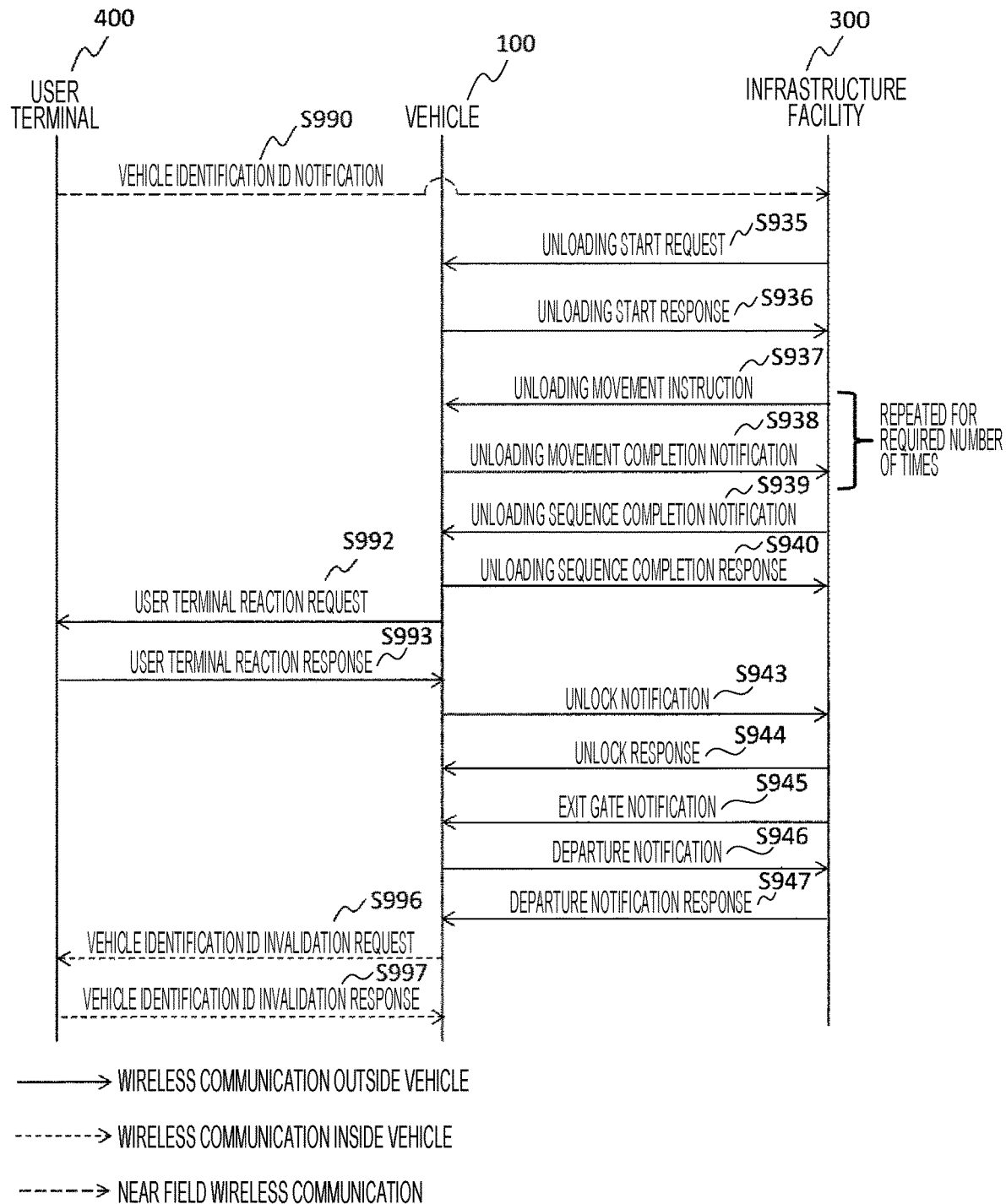
FIG. 14 is an example of a communication procedure among the user terminal, the vehicle, and the infrastructure facility at the time of unloading.
Figure 15:
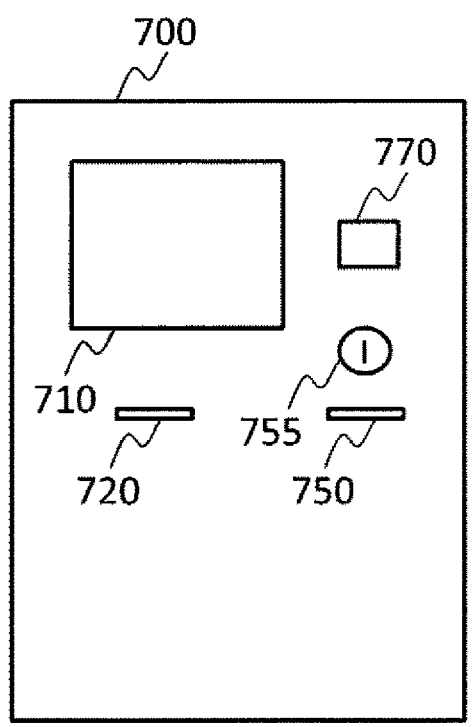
FIG. 15 illustrates an example of a payment terminal of the infrastructure facility.

FIG. 13 illustrates an operation of moving the vehicle 100 from the parking frame 51 to the platform 15 in the infrastructure facility management region 301, and FIG. 14 illustrates the communication procedure among the vehicle 100, the infrastructure facility 300, and the user terminal 400 for such an operation. However, in the configuration not involving the user terminal 400, alternative means such as reading of the parking ticket and the like is used for the vehicle identification ID notification S990 for notifying the infrastructure facility 300 of the information for identifying the vehicle 100 as the unloading target vehicle.

Also in the operation for unloading, the vehicle 100 uses the vehicle-side communication device 110 therein to communicate with the infrastructure facility 300 as in the case of loading. Specifically, the vehicle-side communication device 110 communicates with the autonomous driving control device 130 as appropriate so that the autonomous driving control device 130 instructs the vehicle control device 210 to operate the vehicle 100 in accordance with the instruction from the infrastructure facility 300. Here, the vehicle 100 is operated with the highest priority on safety, also as in the case of loading.

When the user 21 makes the vehicle 100 unloaded by using the payment terminal 700, the user 21 enters the parking ticket into a parking ticket insertion slot 720 of the payment terminal 700, or touches the user terminal touch portion 770 with the user terminal 400, to notify the infrastructure facility 300 of the vehicle identification code of the vehicle 100 that is the exiting target. Touching the payment terminal 700 with the user terminal 400 to transmit the vehicle identification code to the infrastructure facility 300 corresponds to the vehicle identification ID notification S990 in FIG. 14. The payment terminal 700 makes an inquiry to the infrastructure management device 330 based on the vehicle identification code obtained from the parking ticket or the user terminal 400 to acquire a payment fee based on the parking time, an optional service usage status, and the like, and displays the payment content on the payment terminal display portion 710 to prompt the user 21 to pay the fee.

When the user pays the payment fee using a bill insertion slot 750 and/or a coin insertion slot 755 and when the infrastructure facility 300 has the authority to control the vehicle 100, the infrastructure facility 300 prompts the user 21 to wait at the platform 15 as the infrastructure facility 300 calls the vehicle 100. If the infrastructure facility 300 does not have the authority to control the vehicle 100, the user 21 is prompt to move directly to the vehicle. The infrastructure facility 300 cannot move the vehicle 100 under its control at the time of loading due to a certain reason, the user 21 is notified of the position of the vehicle 100 in the infrastructure facility management region 301, a required message is issued, and confirmation to the user 21 is performed. For example, when the vehicle is being charged, it is confirmed whether charging should be interrupted, and when car wash for the vehicle is still in progress, a message indicating how long it takes to for the unloading is output. However, if the position of the vehicle 100 is unknown, the last location recognized may be notified, or the location may not be notified at all.

When there are a plurality of platforms 15, the payment terminal 700 checks which one of the platforms 15 the user 21 wants to use. If the payment terminal 700 is close to a certain platform 15, the location is displayed while being emphasized with the location enlarged or the color of the location changed, so that the user 21 can easily select the platform 15.

When the payment is completed, the information indicating the completion is transmitted from the payment terminal 700 to the infrastructure management device 330 in the infrastructure facility 300. Then, the infrastructure management device 330 plans the parking position of the vehicle 100 corresponding to the vehicle identification code and the movement route from the platform 15. Then, the infrastructure management device 330 issues an instruction to the vehicle 100 via the infrastructure-side communication device 310.

To move the vehicle 100 to the platform 15, the infrastructure facility first transmits an unloading start request S935 to the vehicle 100. The vehicle 100 in the parked state receives the unloading start request S936 from the infrastructure facility 300, and starts preparations for moving the vehicle 100. Specifically, the power source 220 is activated. When the power source 220 is properly activated, the vehicle 100 transmits an unloading start response S936 to the infrastructure facility 300 as a response. If the power source 220 fails to be activated, information indicating the failure is sent to the infrastructure facility 300, and the infrastructure facility 300 and the vehicle 100 abandon the movement of the vehicle 100.

The infrastructure facility 300 that has received the unloading start response S936 transmits an unloading movement instruction S937 including information about the movement route and the destination. The vehicle 100 that has received unloading movement instruction S937 confirms that there is no abnormality in communication, and then the automatic driving control device 130 instructs the vehicle control device 210 to make the vehicle 100 operate in accordance with the instruction. At this time, when the first movement starts, the brake device 240 is released from the parking state, and the power train 230 is switched to the state for moving. The movement is performed with the highest priority on safety by using the external sensor 170, and an appropriate risk aversion operation is performed with priority over the instruction from the infrastructure facility 300, as in the case of the loading. When a communication abnormality is detected, a retransmission request is transmitted to the infrastructure facility 300, and the communication is retried for a predetermined number of times.

Upon completing the movement to the position given in instruction by the unloading movement instruction S937 by the function of the autonomous driving control device 130, the vehicle 100 transmits an unloading movement completion notification S938 to the infrastructure facility 300.

If an additional movement is required, the infrastructure facility 300 transmits the unloading movement instruction S937 to the vehicle 100 again. Thus, the communication procedure involving the unloading movement instruction S937 and the unloading movement completion notification S938 is repeated for a required number of times.

When the movement of the vehicle 100 is completed, the infrastructure facility 300 transmits an unloading sequence completion notification S939 to the vehicle 100, and the vehicle 100 transmits an unloading sequence completion response S940 to the infrastructure facility 300 as a response.

After transmitting the unloading sequence completion response S940, the vehicle 100 sets the power train 230 and the brake device 240 to be in the parking state and waits for the user 21 to unlock the door and get on the vehicle 100.

The door of the vehicle 100 in which the user terminal 400 is present is unlocked in the following manner. Specifically, when the user 21 performs an operation corresponding to the door unlocking, such as touching a specific part of the vehicle 100, directly on the vehicle 100, a user terminal reaction request S992 is transmitted to the user terminal 400, and the door unlocking is performed when the user terminal 400 returns a user terminal reaction response S993.

When the user 21 presses the "unlock" 420 button on the user terminal 400, the user terminal reaction request S992 is omitted, and a door unlocking request signal is transmitted, instead of the user terminal reaction response S993, from the user terminal 400 to the vehicle 100. Then, the vehicle 100 unlocks the door upon receiving the signal.

In a case of the vehicle 100 using biometric authentication for unlocking the door, a biometric sensor is prepared at a part to be touched for unlocking the door. Then, with the sensor, it is determined whether the user 21 is the authorized user. When it is confirmed that the user is the authorized user, the door is unlocked.

When the unlocking of the door is completed, the vehicle 100 transmits an unlock notification S943 to the infrastructure facility 300, and the infrastructure facility 300 transmits an unlock response S944 to the vehicle 100 as a response. When the infrastructure facility 300 cannot receive the unlock notification S943 for a certain period of time or more after the vehicle 100 arrives at the platform 15, the infrastructure facility 300 may move the vehicle 100 to the parking frame 51 again in the same manner as the communication procedure for loading the vehicle 100. Thus, the vehicle 100 is prevented from being left at the platform 15 for a long period of time.

After the user 21 gets on, the user 21 drives the vehicle 100 in a usual manner. When the user 21 is in the vehicle 100, the autonomous driving control device 130 does not receive a movement instruction from the infrastructure facility 130 even when the state is the infrastructure control permitted state S5.

When the user 21 drives the vehicle 100 to the exit gate 12, the infrastructure facility 300 recognizes the vehicle 100 with a camera or the like installed at the exit gate 12, and sends an exit gate notification S945 to the vehicle 100 identified by the recognition. The vehicle 100 transmits a departure notification S946 to the infrastructure facility 300 upon receiving the exit gate notification S945. Upon receiving the departure notification S946, the infrastructure facility 300 transmits a departure notification response S947, sets the exit gate 12 to be in a state for enabling the vehicle 100 to pass therethrough, and invalidates the vehicle identification code corresponding to the vehicle 100 managed by the infrastructure facility 300. Upon receiving the departure notification response S947, the vehicle 100 makes the autonomous driving control device 130 transition to the infrastructure control prohibited state S1, and invalidates the vehicle identification code stored in the autonomous driving control device 130 and the user recognition device 180 in the vehicle 100. Furthermore, when the user terminal 400 has a function for storing a vehicle identification code, a vehicle identification ID invalidation request S996 is transmitted to the user terminal 400.

Upon receiving the vehicle identification ID invalidation request S996, the user terminal 400 invalidates the vehicle identification code stored in the user terminal 400 and issues a vehicle identification ID invalidation response S997.

Upon receiving the departure notification response S947, the vehicle 100 displays on the touch panel display 600, a message indicating that the vehicle 100 has departed from the infrastructure facility 300 and a message indicating that the control from the infrastructure facility 300 is deactivated, so the user 21 is notified of the departure from the infrastructure facility 300.

Considering the risk that the departure notification response S947 may fail to be received, the vehicle 100 executes processing that is the same as that in the case where the departure notification response S947 is received, at the timing when the departure from the infrastructure facility management region 301 is detected after the departure notification S946 has been transmitted. The departure from the infrastructure facility management region 301 is performed based on the relationship between the detailed map information of the infrastructure facility management region 301 and the vehicle position detected by the vehicle position detection device 160, or the detection of the passage through the exit gate 12 by the external sensor 170.

At the exit gate 12, the infrastructure facility 300 may use the dedicated short range communications instead of recognizing the vehicle 100 by using a camera and the like. In this case, the infrastructure facility 300 transmits the exit gate notification S945 to the vehicle 100 using the dedicated short range communications at the exit gate 12, and the vehicle 100 transmits the departure notification S946 to the infrastructure facility 300 using the dedicated short range communications. In response to this, the infrastructure facility 300 notifies the vehicle of a departure notification response S947 using dedicated short range communications, puts the exit gate 12 to be in a passage enabled state, and invalidates the vehicle identification code corresponding to the vehicle 100. As in the case where the dedicated short range communications is not used at the exit gate 12, the vehicle 100 causes the message on the touch panel 600, and invalidates all the vehicle identification codes in the devices in the vehicle 100 as well as the user terminal 400.

When the vehicle 100 is unloaded, a user option terminal 490 having a function for communicating with the vehicle 100 even at a place away from the vehicle 100 may be used instead of the user terminal 400. The communication procedure in this case will be described with reference to FIG. 16. The user option terminal 490 may be a dedicated device or a smartphone and the like in which a dedicated application is installed, as long as information required for encrypted communication and authentication is exchanged with the vehicle-side communication device 110 of the vehicle 100 in advance. The user option terminal 400 and the vehicle 100 communicate with each other by using encryption with authentication.

When the unloading is performed by using the user option terminal 490, first of all, a remote unloading request S985 is transmitted from the user option terminal 490 to the vehicle 100.

The vehicle 100 that has received the remote unloading request S985 confirms the validity of the received content, and if there is no problem, transmits the unloading request S930 including the vehicle identification code to the infrastructure facility 300.

Upon receiving the unloading request S930, the infrastructure facility 300 identifies the unloading target vehicle by the vehicle identification code, calculates the fee, and transmits a payment request S931 to the vehicle 100 together with fee detail information. Upon receiving the payment request S931, the vehicle 100 transmits a payment confirmation S986 including the fee detail information to the user option terminal 400.

When there are a plurality of platforms 15 in the infrastructure facility management region 301, a list of the platforms 15 that can be used is included in the payment request S931 and the payment confirmation S986 together with the fee detail information. At this time, additional information such as the congestion status and the required arrival time of the vehicle 100 may be added for each platform 15.

Upon receiving the payment confirmation S986, the vehicle presents the payment information to the user 21, requests the user for confirmation, and makes the user input information of a credit card and the like as necessary. The information of a credit card and the like may be stored in advance in the user option terminal 490 and used. If there is the list of platforms 15, the user 21 is also requested to select the platform 15.

When the user 21 checks the payment details, operates the user option terminal 490 to select the platform 15 as necessary, and accept the payment details, the user option terminal 490 transmits a payment permission response S987, including information required for the payment such as the credit card information and also including the selection information of the platform 15 as appropriate, to the vehicle 100.

Upon receiving the payment permission information S987, the vehicle 100 transmits to the infrastructure facility 300 payment processing information S932 including the information required for payment and if necessary, selection information of the platform 15. Upon receiving the payment processing information S932, the infrastructure facility 300 executes the payment processing. Upon confirming the completion of the payment, the infrastructure facility 300 transmits a payment completion response S933 to the vehicle 100. Upon receiving the payment completion response S933, the vehicle 100 transmits a payment completion notification S988 to the user option terminal 490.

Upon receiving the payment completion notification S988, the user option terminal 490 notifies the user 21 that unloading procedure start confirmation is in progress.

After the completion of the communication procedure involved in the payment processing, the infrastructure facility 300 transmits an unloading start request S935 to the vehicle 100. Upon receiving the unloading start request S935, the vehicle 100 starts preparation for moving the vehicle 100, as in the case where the user 21 performs the unloading operation using the payment terminal 700. When the vehicle 100 becomes ready to move, an unloading start notification S989 is transmitted to the user option terminal 490. Furthermore, an unloading start response S936 is transmitted to the infrastructure facility 300 as a response to the unloading start request S935. Thereafter, as in the case where the user 21 attempts the unloading using the payment terminal 700, the communication after the unloading movement instruction S937 illustrated in FIG. 14 is performed.

Upon receiving the unloading start notification S989, the user option terminal 490 displays information to notify the user 21 that the unloading operation of the vehicle 100 has started.

When the dedicated short radio with a communication function required for the payment processing is used at the exit gate 12 for executing the payment processing at the time of passing through the exit gate 12, the communication may be used only for the selection of the platform 15 in the communication procedure from the payment request S931 to the payment completion notification S988, and may be omitted if there is only a single platform 15. Still, in this case, the infrastructure facility 300 is required to confirm whether the payment processing can be executed by the vehicle 100 using the dedicated short radio at the time of loading, and is also required to check whether the payment processing through the communication from the payment request S931 to the payment completion notification S988 can be omitted based on a result of the confirmation.

By using the user option terminal 490, the user 21 does not need to go to the payment terminal 700. Furthermore, when getting on the vehicle 100, the user 21 can request for the unloading of the vehicle 100 beforehand considering a time required for moving to the platform 15.

Also when the user option terminal 490 is used, the user option terminal 490 communicates with the vehicle 100 and communicates with the infrastructure facility 300 via the vehicle 100. Therefore, the user option terminal 490 can be designed for the vehicle 100 regardless of the function and the communication scheme of the infrastructure facility 300.

When the communication between the vehicle 100 and the infrastructure facility 300 is interrupted due to an abnormality occurred in communication using a wireless LAN and the like, the communication procedure illustrated in FIG. 5 is implemented again to guarantee security. In this case, as soon as a secure communication path is achieved, the vehicle identification code is transmitted from the vehicle 100 to the infrastructure facility 300, and the association of information necessary for communication between the infrastructure facility 300 and the vehicle 100 is updated.

Furthermore, in order to prevent unauthorized control of the vehicle 100 through interruption of communication between devices in the vehicle 100 such as the vehicle-side communication device 110, the autonomous driving control device 130, and the user authentication device 180, in addition to the secure communication performed between the vehicle 100 and each of the infrastructure facility 300, the user option terminal 400, and the user option terminal 490, encrypted communication with the authentication function needs to be used for communication between the devices in the vehicle 100 to ensure secure communication paths for these types of communications.

FIG. 17 illustrates an example of information communicated between the vehicle 100 and the infrastructure facility 300 using the dedicated short radio at the entrance gate 11. FIG. 17 illustrates correspondence between communication names and contents included in command parameters that are parameters transmitted by the communication. In actual communication, information required for identifying a communication source and a communication destination (such as a physical connection destination and software processing information transmitted by the communication) is followed by information indicating which communication corresponds to which communication name. Furthermore, there is a command parameter and a checking value for detecting abnormality such as a damage in the communication content.

A vehicle presence signal S900 is a signal used by the vehicle 100 to inform the infrastructure facility 300 of the presence of a communication partner, and includes no command parameter because the infrastructure facility 300 detects the partner in the dedicated short radio. Still, information about the communication source included in the vehicle presence signal S900 is used as communication destination information used by the infrastructure facility 300 for communicating with the vehicle 100 using the dedicated short radio.

The externally linked autonomous driving compatibility confirmation S901 has a command parameter including information about a list of functions linked to autonomous vehicles on the side of the infrastructure facility 300 in the command parameter. By checking this command parameter, the vehicle 100 can determine whether the infrastructure facility 300 has a function for controlling the vehicle 100. The externally linked autonomous driving compatibility response S902 is a response from the vehicle 100 for the externally linked autonomous driving compatibility confirmation S901, and has a command parameter including information related to a list of functions corresponding to the vehicle 100 extracted from the list of functions linked with the autonomous driving vehicles on the side of the infrastructure facility 300. The infrastructure facility 300 can confirm whether the vehicle 100 has a function to be controllable by the infrastructure facility 300, by receiving the externally linked autonomous driving compatibility response S902.

The communication scheme change notification S903 is transmitted from the infrastructure facility 300 to the vehicle 100 to change the communication scheme used between the infrastructure facility 300 and the vehicle 100, and has information for identifying the communication scheme to be used after the change, information required for establishing the communication scheme, and information for confirming whether the connection destination after the change in the communication scheme is a communication destination belonging to the same infrastructure facility 300. For example, when changing from a dedicated short radio to a wireless LAN, the notification includes a communication scheme identification number indicating the user of the wireless LAN, SSID of the wireless LAN, authentication information required for connection to an access point of the wireless LAN, and the like. The notification further includes a public key for public key encryption included in the infrastructure certificate S907 received by the infrastructure facility 300 when the communication scheme is changed, for confirming whether the connection destination after the change in the communication scheme is a communication destination belonging to the same infrastructure facility 300.

The communication scheme change response S904 is transmitted from the vehicle 100 to the infrastructure facility 300 to inform whether or not the vehicle 100 accepts the change to the communication scheme designated by the infrastructure facility 300, and includes information indicating whether the change is accepted. The vehicle 100 accepts the change only when the communication path is successfully established with the communication scheme designated by the infrastructure facility 300. If the vehicle 100 does not accept the change, the infrastructure facility 300 transmits another communication scheme within a supportable range by using the communication scheme change notification S903, and the vehicle 100 returns the communication scheme change response S904 in response to the notification. This is repeated as necessary to find the communication scheme that can be used by both the infrastructure facility 300 and the vehicle 100. Note that with the communication scheme change notification S903, a plurality of communication schemes supported by the infrastructure facility 300 may be collectively designated, and the vehicle 100 may select the usable communication scheme from these, so that the number of times the communication of the communication scheme change notification S903 and the communication scheme change response S904 is repeated can be reduced. When a plurality of communication schemes supported by the infrastructure facility 300 are collectively included in the communication scheme change notification S903, the communication schemes that can be supported by the infrastructure facility 300 may all be included. Furthermore, the communication scheme to be included may be changed in accordance with the number of times the communication scheme change notification S903 and the communication scheme change response S904 are exchanged, so that the communication scheme preferably used by the infrastructure facility 300 are included in order from that corresponding to the first communication scheme change notification S903.

The contents of communication used in the communication procedure (procedure illustrated in FIG. 5) until a secure communication is established after the communication scheme is changed are described with reference to FIGS. 18, 19, and 20.

FIG. 18 illustrates a configuration of a communication packet. Header information 821 includes information for identifying the communication source and the communication destination, and management information for a communication status and the like. The information for identifying the communication destination and communication source not only includes information for identifying a physical device but also includes information required for identifying individual software operating in the device. Further, the structure of the communication packet is hierarchized depending on the communication scheme to be used, and headers required for the respective hierarchies may be included in order. For example, when using a TCP/IP protocol on a wireless LAN compliant with IEEE802.11, there is an IEEE802.11 Media Access Control (MAC) frame header after the header indicating the synchronization and modulation method scheme added in the physical layer. In the header, an IP protocol is designated. The header is followed by an IP header in which a TCP protocol is designated. Finally, a TCP header is provided.

A command code 825 is information for identifying which of the communication names corresponds to the communication packet in the communication between the vehicle 100 and the infrastructure facility 300. A command parameter 826 is a parameter referred to when the communication packet is processed. Packet confirmation information 822 is a Cyclic Redundancy Check (CRC) code for checking whether the packet is damaged.

FIG. 19 illustrates the correspondence between a communication name and information included in a command parameter of a packet transmitted by the communication.

Supporting security scheme notification S905 is transmitted for the vehicle 100 to inform the infrastructure facility 300 of available encryption schemes, and includes a list of encryption schemes that can be used on the side of the vehicle 100 as command parameters and information about pseudo random number generated in the vehicle 100. Each of the encryption schemes included in the list of encryption schemes includes a public key encryption algorithm and its key length, a common key encryption algorithm and its key length, and an algorithm of a hash function 895 for generating a message authentication code 882.

Security scheme selection notification S906 is transmitted from the infrastructure facility 300 to notify the vehicle 100 of an encryption scheme actually used, and has a command parameter including an encryption scheme selected by the infrastructure facility 300 from the list of encryption schemes in the supporting security scheme notification S905 and information about pseudo random number generated in the infrastructure facility 300.

The infrastructure certificate S907 is used by the infrastructure facility 300 for transmitting information certifying that the infrastructure facility 300 is a legitimate facility to the vehicle 100, and has a command parameter including certificate information (what is known as an electronic certificate) related to the infrastructure facility 300. This electronic certificate includes the public key of the infrastructure facility 300 required for the vehicle 100 and the infrastructure facility 300 to use public key encryption, information on the infrastructure facility 300 (operating company name and information for identifying the facility on the Internet), valid period, and information on the certificate authority that has signed the certificate. An electronic sign (as a result of encrypting a hash value of the certificate content generated by a hash function with a secret key of the certificate authority by using the public key encryption).

The certificate authority is a third party that is different from the infrastructure facility 300, and checks the legitimacy of the infrastructure facility 300 and the contents described in the electronic certificate. If there is no problem, the hash value of the certificate of the infrastructure facility 300 is encrypted using the secret key of the certificate authority and the resultant value is provided to the infrastructure facility 300.

A public key of a trusted certificate authority is registered in advance in the vehicle 100 at the time of factory shipment or the like, and it is checked whether the certificate authority of a signer included in the electronic certificate of the infrastructure facility 300 is registered. If it is not registered, it is determined that the infrastructure facility 300 is not a legitimate facility, and the infrastructure facility 300 is notified that the communication on the communication path is not permitted but is rejected.

When the certificate authority of the signer included in the electronic certificate is included in the trusted certificate authority, the hash value of the electronic certificate of the infrastructure facility 300 is decrypted with the public key corresponding to the certificate authority. The decryption result is compared with the hash value of the electronic certificate of the infrastructure facility 300 calculated inside the vehicle 100. If they match, the infrastructure facility 300 is determined to be a legitimate facility and continues the subsequent communication. If they do not match, it is determined that the infrastructure facility 300 is not a legitimate facility, and the infrastructure facility 300 is notified that the communication on the communication path is not permitted but is rejected.

If the electronic certificate has no problem, whether the public key of the infrastructure facility 300 matches the public key of the infrastructure facility 300 received in the communication scheme change notification S903 is determined to confirm that the infrastructure facility 300 has not been replaced by another facility before and after the change in the communication scheme. When the replacement is detected, the infrastructure facility 300 is determined not to be the original communication partner. Thus, the infrastructure facility 300 is notified that the communication using the communication scheme is unacceptable and thus is rejected.

By checking the electronic certificate of the infrastructure facility 300 as described above, it is possible to prevent the vehicle 100 from connecting to a device that is preventing to be the infrastructure facility 300 to control the vehicle 100.

A common key generation information provision request S908 is transmitted for completing all transmissions of information required for encrypted communication from the infrastructure facility 300 to the vehicle 100, and for requesting the vehicle 100 for the provision of information required for generating a common key required for common key encrypted communication. This includes no command parameters.

Common key generation information S909 is for transmitting information about random number for generating a common key master based on which the common key is generated, from the vehicle 100 to the infrastructure facility 300. This random number is generated in the vehicle 100 separately from the random number transmitted using the supporting security scheme notification S905, and is encrypted with the public key encryption using the public key included in the electronic certificate of the infrastructure facility 300. Then the resultant random number is transmitted to the infrastructure facility 300. The infrastructure facility 300 decrypts the encrypted random number received from the vehicle 100 using a secret key corresponding to the public key.

The vehicle 100 and the infrastructure facility 300 generates a common key master using the same algorithm, based on the random number on the side of the vehicle 100 shared through the supporting security scheme notification S905, the random number on the side of the infrastructure facility 300 shared through the security scheme selection notification S906, and the random number shared by using public key encryption with the common key generation information S909.

From the common key master, the vehicle 100 and the infrastructure facility 300 generate a common key (common key 1) used for encryption processing 890, a common key (common key 2) given to authentication hash function 895 for generating a message authentication code 882 for encrypted communication data 855, and an initial value required in the encryption processing 890, as two common key sets 885 including a set used for communication from the vehicle 100 to the infrastructure facility 300 and a set used for communication from the infrastructure facility 300 to the vehicle 100. The vehicle 100 and the infrastructure facility 300 share these common keys and initial value by generating these common keys and the initial value using the same algorithm. The four common keys and the two initial values are generated by repeating the calculation using a hash function or the like from the common key master to generate a long bit string and cutting out different sections, or performing the other like operation.

Vehicle side common key preparation completion notification S910 is for confirming that the common key set 885 has been successfully prepared with the vehicle 100 transmitting the common key generation information S909, and is used for notifying that the communication transmitted from the vehicle 100 from then on is encrypted by using the common key set 885 used for transmission from the vehicle 100 to the infrastructure facility 300. When the vehicle 100 transmits the vehicle side common key preparation completion notification S910, the vehicle 100 resets a sequence number 886 used for encrypted transmission from the vehicle 100 to 0. Upon receiving the vehicle side common key preparation completion notification S910, the infrastructure facility 300 resets the sequence number 886 used for receiving a packet with a format illustrated in FIG. 20 from the vehicle 100 to 0.

A vehicle side communication preparation confirmation code S911 is transmitted from the vehicle 100 to notify the infrastructure facility 300 that the procedure for performing encrypted communication has been completed. A command parameter includes a hash value of the content obtained by combining the communication content from the supporting security scheme S905 to the vehicle side common key preparation completion notification S910 and the common key master, each regarded as a bit string. This communication is transmitted after the vehicle side common key preparation completion notification S910 is transmitted. Thus, the encrypted communication data 855 and the message authentication code 882 are generated by using the common key set 885 used for communication from the vehicle 100 to the infrastructure facility 300, and are transmitted with the communication packet format illustrated in FIG. 20.

Figure 20:
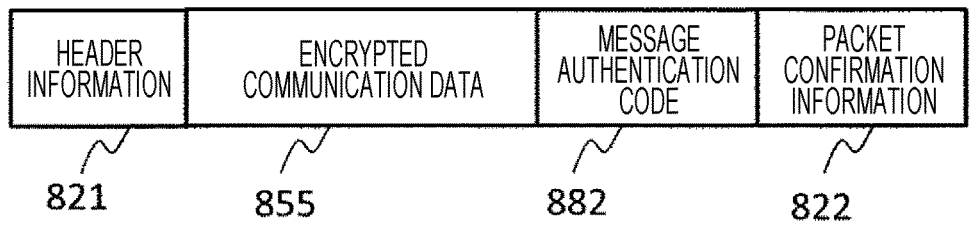
FIG. 20 illustrates an example of a configuration of a communication packet in secure communication between the infrastructure facility and the vehicle.
Figure 21:
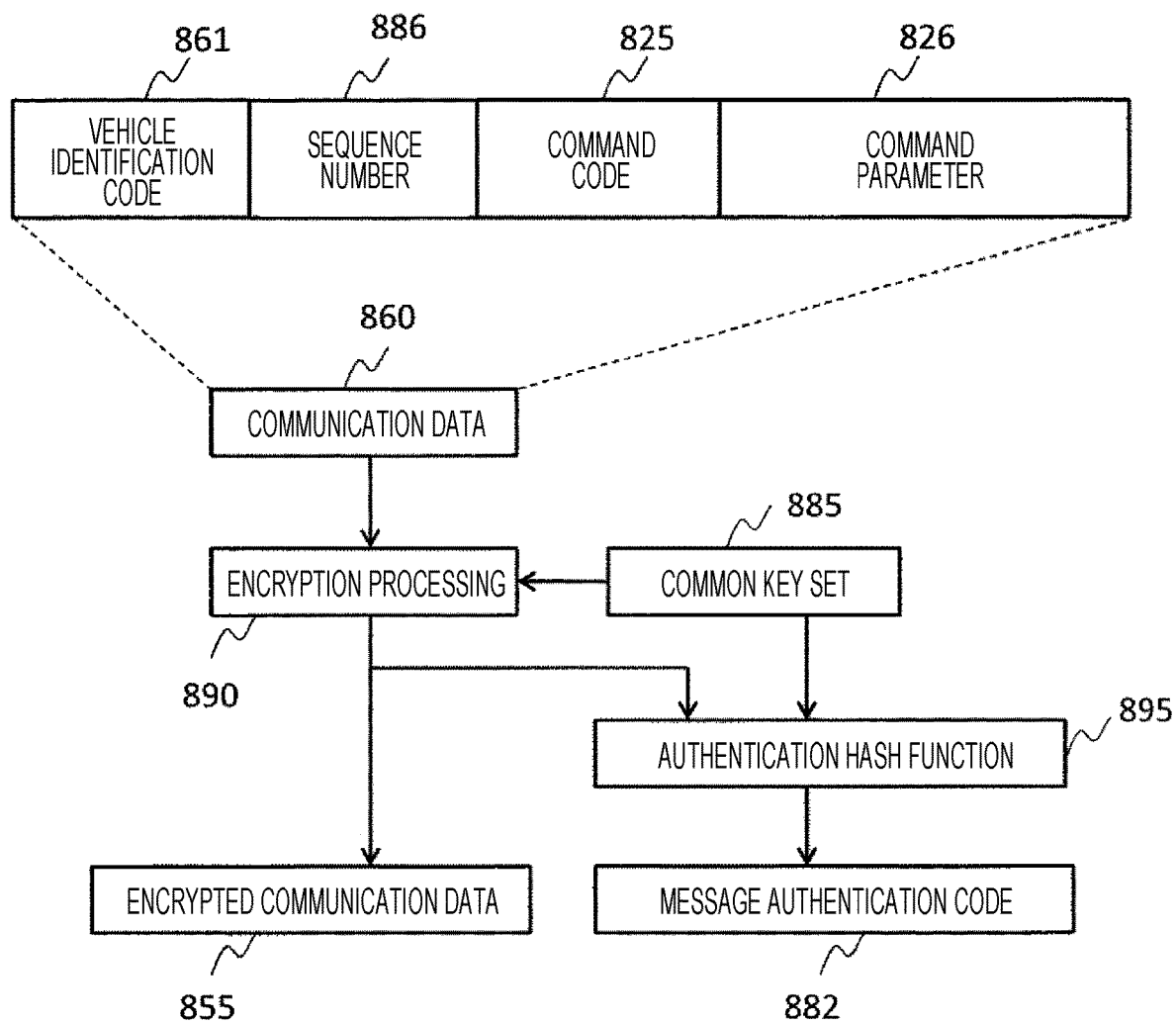
FIG. 21 illustrates an example of a procedure for generating encrypted communication data and a message authentication code.

In the packet format shown in FIG. 20, the header information 821 and the packet confirmation information 822 are the same as those in the packet format illustrated in FIG. 18. The encrypted communication data 855 and the message authentication code 882 are data obtained by encrypting a bit string as a result of combining the vehicle identification code 861, the sequence number 886, the command code 825, and the command parameter 826 each regarded as a bit string. The sequence number 886 is a value that is incremented by 1 every time a packet with the format illustrated in FIG. 20 is transmitted, and the message authentication code 882 is a bit string for confirming the validity of the encrypted communication data 855 and is generated at the time when the encryption is performed. When the packet illustrated in FIG. 20 is received, the receiving side combines the encrypted communication data 855 and the common key for calculating the hash value for authentication corresponding to the communication direction of the common key set 885 each regarded as a bit string. Then, whether the message authentication code 882 calculated with the authentication hash function 895 matches the received message authentication code 882 is checked. Furthermore, a value for checking the sequence number 886 in the result of decrypting the encrypted communication data 855 and a value for checking the sequence number 886 counted on the receiver side are compared to check whether the values match, to confirm that the communication data is normal. The value for checking the sequence number 886 counted on the receiving side is incremented by 1 after receiving a normal packet, in preparation for the next reception.

Upon receiving the vehicle side communication preparation confirmation code S911, the infrastructure facility 300 uses the common key set 885 used for communication from the vehicle 100 to the infrastructure facility 300, to generate the message authentication code 882 for the encrypted communication data 855 received based on the authentication hash function 895, and compares the message authentication code 882 with the message authentication code 882 received, to confirm the validity of the encrypted communication data 855. Furthermore, the encrypted communication data 855 is decrypted with the same common key set 885 to confirm that the sequence number 886 is 0. Then, the hash value included in the command parameter of the decryption result is compared with the hash value of the content obtained by combining the content of the communication from the supporting security scheme S905 to the vehicle side common key preparation completion notification S910 and the common key master each regarded as a bit string calculated in the infrastructure facility 300. When a match is confirmed in all of the comparisons, it is determined that the normal communication is performed. If an abnormality is detected, the vehicle 100 is notified of the detection of the abnormality, and the communication procedure shown in FIG. 5 is repeated from the start for a designated number of times. If normal communication cannot be performed even when the procedure is repeated for a designated number of times, communication by the communication scheme is abandoned.

Infrastructure side common key preparation completion notification S912 is for confirming that the common key set 885 has been successfully prepared by the infrastructure facility 300, and is used for notifying that the communication transmitted from infrastructure facility 300 from then on is encrypted by using the common key set 885 used for transmission from the infrastructure facility 300 to the vehicle 100. When the infrastructure facility 300 transmits the infrastructure side common key preparation completion notification S912, the infrastructure facility 300 resets the sequence number 886 used for encrypted transmission to 0. Upon receiving the infrastructure side common key preparation completion notification S912, the vehicle 100 resets the sequence number 886 used for receiving a packet with a format illustrated in FIG. 20 from the infrastructure facility 300 to 0.

An infrastructure side communication preparation confirmation code S913 is transmitted from the infrastructure facility 300 to notify the vehicle 100 that the procedure for performing encrypted communication has been completed. A command parameter includes a hash value of the content obtained by combining the communication content from the supporting security scheme S905 to the infrastructure side common key preparation completion notification S912 and the common key master, each regarded as a bit string. This communication is transmitted after the infrastructure side common key preparation completion notification S912 is transmitted. Thus, the encrypted communication data 855 and the message authentication code 882 are generated by using the common key set 885 used for communication from the infrastructure facility 300 to the vehicle 100, and are transmitted with the communication packet format illustrated in FIG. 20.

Upon receiving the infrastructure side communication preparation confirmation code S913, the vehicle 100 uses the common key set 885 used for communication from the infrastructure facility 300 to the vehicle 100, to generate the message authentication code 882 for the encrypted communication data 855 received based on the authentication hash function 895, and compares the message authentication code 882 with the message authentication code 882 received, to confirm the validity of the encrypted communication data 855. Furthermore, the encrypted communication data 855 is decrypted with the same common key set 885 to confirm that the sequence number 886 is 0. Then, the hash value included in the command parameter of the decryption result is compared with the hash value of the content obtained by combining the content of the communication from the supporting security scheme S905 to the infrastructure side common key preparation completion notification S912 and the common master each regarded as a bit string calculated in the vehicle 100. When a match is confirmed in all of the comparisons, it is determined that the normal communication is performed. If an abnormality is detected, the infrastructure facility 300 is notified of the detection of the abnormality, and the communication procedure shown in FIG. 5 is repeated from the start for a designated number of times. If normal communication cannot be performed even when the procedure is repeated for a designated number of times, communication by the communication scheme is abandoned.

Note that the processing of changing the communication path on the side of the vehicle 100 may be executed by the vehicle-side communication device 110, and the vehicle-side communication device 110 may transmit information required for the state transition of the autonomous driving control device 130 based on the processing result. Alternatively, processing may be executed including: transmitting from the vehicle-side communication device 110, information required for determining whether the communication path change is permitted to the autonomous driving control device 130; determining, by the autonomous driving control device 130 whether to permit the change in the communication path; transmitting a result of the determination to the vehicle-side communication device 110; and changing, by the vehicle-side communication device 110, the communication path based on the content of the result. In any case, if there is no scheme available as the communication scheme after the change, it is determined that the vehicle 100 cannot be controlled by an instruction from the infrastructure facility 300. Thus, the autonomous driving control device 130 transitions to the infrastructure control prohibited state S1.

When the communication up to the infrastructure side communication preparation confirmation code S913 is properly completed, communication thereafter is performed with the communication packet format illustrated in FIG. 20. Thus, all communications between the vehicle 100 and the infrastructure facility 300 illustrated in FIGS. 6, 12, 14, and 16 are performed with the communication packet format illustrated in FIG. 20.

A flow of generating the encrypted communication data 855 and the message authentication code 882 will be described with reference to FIG. 20.

First of all, the communication data 860 is generated by combining the vehicle identification code 861, the sequence number 886, the command code 825, and the command parameter 826 each regarded as a bit string. Next, the common key and the initial value for the encryption processing 890 included in the common key set 885 is used to encrypt the communication data 860, whereby the encrypted communication data 855 is generated. Next, the encrypted communication data 855 and the common key for generating the message authentication code 882 included in the common key set 885, each regarded as a bit string, are combined, and the hash function (authentication hash function 895) used for authentication is used for generating the message authentication code 882.

An operation of the vehicle 100 in a case where the vehicle 100 might depart from the infrastructure facility management region 301 due to a certain abnormality occurring in the infrastructure facility 300, the vehicle 100, or communication between these while the infrastructure facility 300 is instructing the vehicle 100 to move, will be described with reference to FIGS. 22 and 23. Such an event can occur not only when the infrastructure facility 300 or the vehicle 100 fails, but may also occur when a security problem occurs in the communication.

Figure 22:
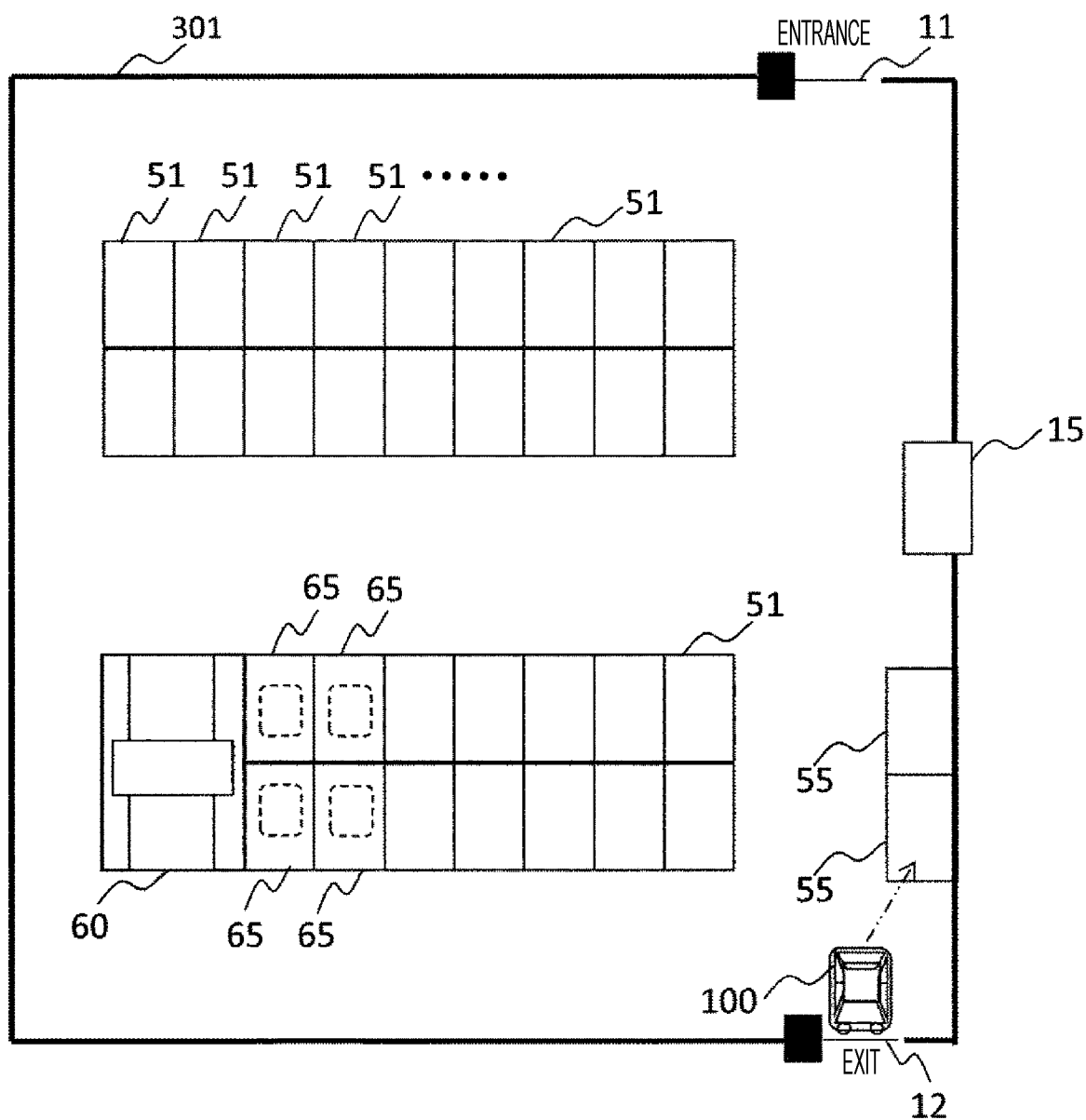
FIG. 22 illustrates an example of movement of a vehicle attempting to depart from the infrastructure facility management region.

FIG. 22 illustrates an example in which the vehicle 100 is likely to depart from the infrastructure facility management region 301.

The vehicle 100 without the user 21 is about to move in the direction of exiting through the exit gate 12 in accordance with an instruction from the infrastructure facility 300. The vehicle 100 determines whether such movement has occurred based on detailed map information of the infrastructure facility management region 301, region information on a public road portion of the map that the vehicle 100 holds in advance, information from the external sensor 170, and the like. With the map stored in advance and information from the external sensor 170 used by the vehicle 100, even if there is an abnormality in the information of the infrastructure facility management region 301, it can be detected that the vehicle 100 is about to move out of the infrastructure facility management region 301.

Upon detecting that the vehicle 100 is instructed by the infrastructure facility 300 to move out from the infrastructure facility management region 301, the vehicle 100 transmits information indicating an abnormal state to the infrastructure facility 300 together with the current position of the vehicle 100, and requests for a new movement instruction S953 (the loading movement instruction S926 at the time of loading, and the unloading movement instruction S937 at the time of unloading). If movement in the management region of the infrastructure facility 300 is given in instruction by the newly received movement instruction S953 or the like, the vehicle follows the instruction.

If the newly received movement instruction S953 or the like includes movement involving a portion outside the infrastructure facility management region 301, the permission to follow the instruction from the infrastructure facility 300 is canceled. Then, the vehicle 100 checks the location of an emergency parking frame 55 shown on the detailed map of the infrastructure facility management region 301, determines the route or detour to that point by the autonomous driving control device 130, and moves to that position. Here, the vehicle 100 is moved with the highest priority on safety, by using the external sensor 170.

During this movement, if a movement outside the infrastructure facility management region 301 is detected again by the map held in advance by the vehicle 100 or by the external sensor 170, it is determined that there is an abnormality in the detailed map of the infrastructure facility management region 301 resulting in the position of the parking frame 55 being unknown. Thus, an emergency measure of parking the vehicle at the edge of the path is taken.

This function can not only be applied to the case where the vehicle 100 is likely to depart from the management region of the infrastructure facility 300, but can also be applied to a case where the vehicle continues to follow the instruction from the infrastructure facility 300 despite an unexpected obstacle on a path of the infrastructure facility management region 301, the parking frame 51, or the like, and to a case where the vehicle 100 stays in a stopped state for a long period of time.

When the vehicle 100 cancels the permission to follow the instruction from the infrastructure facility 300, if the vehicle 100 and the infrastructure facility 300 can communicate with each other, the vehicle 100 transmits information indicating the cancelation to the infrastructure facility 300 or transmits parking position information. This information is notified when the user 21 uses the payment terminal 700. When the user option terminal 490 is used, the situation and parking position information are transmitted to the user option terminal 490.

Figure 23:
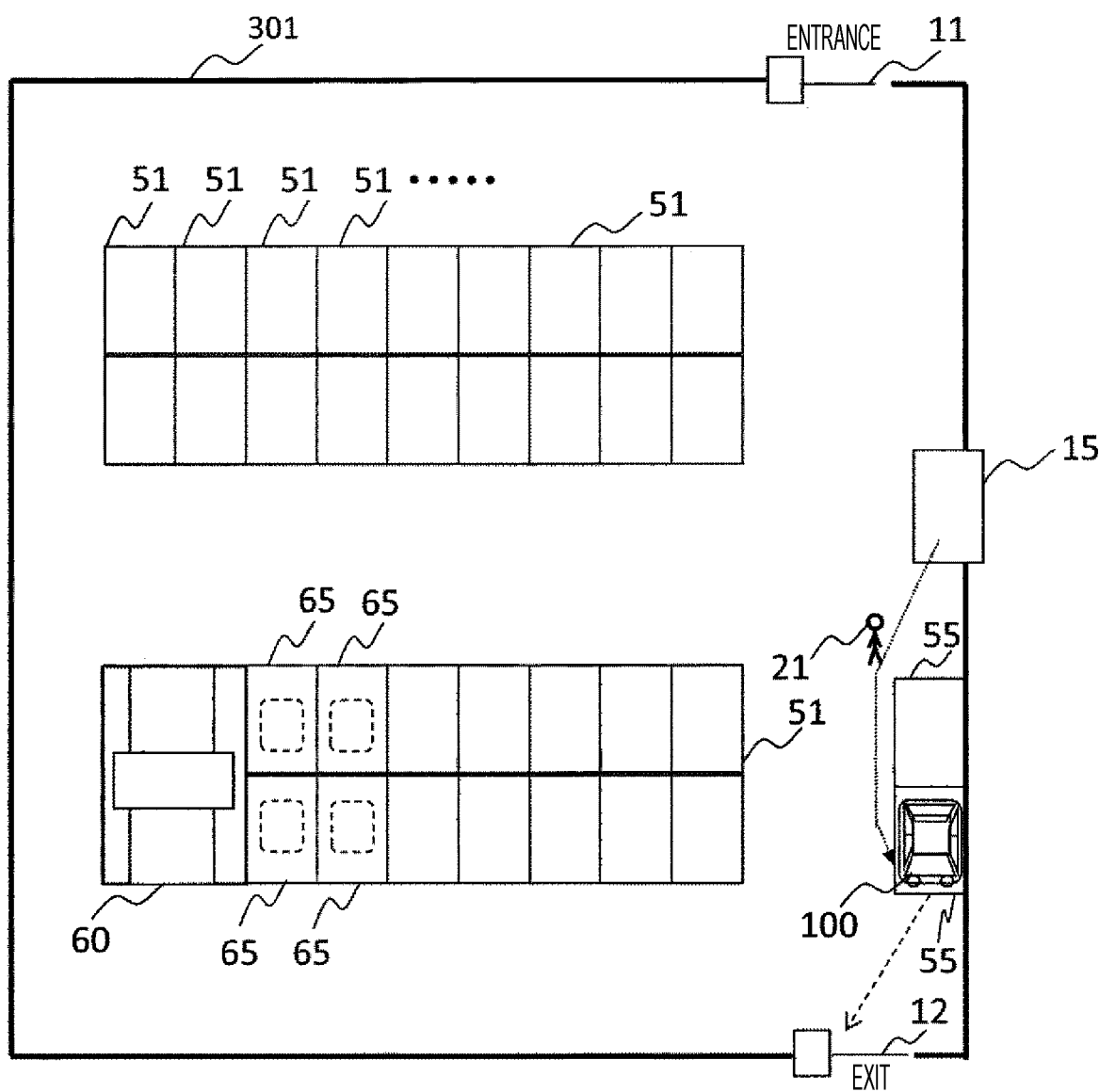
FIG. 23 illustrates an example of movement of a vehicle user to a vehicle unable to be instructed by the infrastructure facility due to detection of abnormal movement and of the vehicle.

When the vehicle 100 cancels the permission to follow the control from the infrastructure facility 300, the user 21 moves directly to the location of the vehicle 100 with reference to the notified parking position information, as illustrated in FIG. 23 and then gets on the vehicle 100 and leaves from the infrastructure facility 300. At the exit gate 12, the driver contacts a manned management room by using an intercom, and then exits the facility.

It should be noted that the configuration and procedure shown in the present embodiment are merely examples, and the configuration of the communication packet, the encryption scheme, and the like may be changed as long as implementation of the functions is not hindered. Communication may be performed with the communication packet divided into a plurality of packets, when required due to restrictions such as communication scheme.

According to the above embodiment, the electronic certificate of the infrastructure facility is checked, making it difficult to impersonate the infrastructure facility. Thus, a damage as a result of the authority to control being taken over by a device unintended by the user of the vehicle or the like. Furthermore, the vehicle authenticates the infrastructure facility, and then establishes encrypted communication with the infrastructure facility to receive control instructions from the infrastructure facility through the encrypted communication. Thus, a risk that the authority to control the vehicle being controlled by an entity other than the infrastructure facility due to security attack can be suppressed.

Furthermore, whether the user is an authorized user of the vehicle is confirmed at the time of loading and the user confirms whether to give the authority to control the vehicle to the infrastructure facility. Thus, the user can confirm that the infrastructure facility will be taking control over the vehicle. Thus, even when the secret key of the infrastructure facility is stolen, a risk that the secret key is maliciously used in a location other than the infrastructure facility can be suppressed so that the authority to control the vehicle can be prevented from being dispossessed against the user's will. In the infrastructure facility, the user can also refuse the control from the infrastructure facility, and can select to perform the parking through a user operation. Thus, the user can select between what is known as valet parking and normal parking.

When a wireless authentication terminal is used to authenticate authorized user in the process of establishing authentication between the infrastructure facility and the vehicle, the wireless authentication terminal communicates with the vehicle only, whereby a simple wireless authentication terminal only performing near field communication can be used. The user's intention confirmation when giving the infrastructure facility the authority to control the vehicle is completed by the processing on the vehicle side, meaning that the infrastructure facility is not involved. Thus, the wireless authentication terminal may be omitted, when the vehicle uses biometric authentication to authenticate the authorized user.

Vehicle identification information is issued at the time of loading and the unloading is performed using the vehicle identification information. Thus, the vehicle can be easily called. Meanwhile, the vehicle identification information is temporary information. Thus, an effect of preventing occurrence of unnecessary unloading processing due to mischief and the like as a result of leakage of vehicle identification information.

The above embodiment can be expressed as follows, for example.

When the infrastructure facility temporarily acquires the right to move the vehicle, the infrastructure facility makes a request to the vehicle to acquire the control authority. When infrastructure facility first issues a request to the vehicle, an electronic certificate including the public key of the infrastructure facility necessary for using public key encryption with information about the issuing source and a signature is attached and transmitted.

A vehicle to which a request for acquiring control authority is issued from the infrastructure facility confirms whether the electronic certificate of the infrastructure facility is valid by using a public key of a reliable certificate authority, such as a public key registered in advance in a device in the vehicle. Upon confirming that the infrastructure facility is legitimate, the vehicle notifies the user of the vehicle of the reception of the request.

The vehicle confirms whether the user is an authorized user of the vehicle based on a presence status of the user terminal, and then the user confirms whether to accept the request from the infrastructure facility. After acquiring the permission from the user, a temporary control authority request from the infrastructure facility is accepted and the notification to the infrastructure facility is performed.

Communication required when the infrastructure facility controls the vehicle is performed through encrypted communication using a common key encryption with authentication. The common key required at this point is as follows. Specifically, a random number generated on the vehicle side is encrypted using a public key encryption using a public key of the infrastructure facility. On the infrastructure side, the random number generated on the vehicle side is decrypted using the secret key corresponding to the public key. Then, with the random number shared between the vehicle and the infrastructure side, the common keys are generated from the random number using the same algorithm in both of the vehicle and the infrastructure facility.

When calling a vehicle at the time of unloading and the like, the temporary identification information issued by the infrastructure facility at the time of loaded is recorded in the vehicle, user terminal, parking ticket, and the like in advance at the time of loading. The vehicle identification information is presented to the infrastructure facility at the time of unloading to request for the movement of the vehicle.

Based on the request, the infrastructure facility gives an instruction to the vehicle and moves the vehicle to a target position.

REFERENCE SIGNS LIST 11 entrance gate
12 exit gate
15 platform
21 (vehicle) user
51 parking frame
55 emergency parking frame
65 parking frame with charging function
60 car wash space
61 car wash machine
100 vehicle
110 vehicle-side communication device
130 autonomous driving control device
150 map information management device
160 vehicle position detection device
170 external sensor
180 user authentication device
190 user interface control device
210 vehicle control device
220 power source
230 power train
240 brake device
250 steering device
300 infrastructure facility
301 infrastructure facility management region
310 infrastructure-side communication device
330 infrastructure management device
350 gate control device
400 user terminal
410 "lock" button
420 "unlock" button
430 "park" button
450 near field wireless antenna
600 touch panel display
610 main message display area
621 "deny" button
622 "permit" button
630 "permit (use option service)" button
650 "charge" button
651 "car wash" button
659 unused button
660 "selection complete" button
669 "return" button
700 payment terminal
710 payment terminal display portion
720 parking ticket slot
750 bill insertion slot
755 coin insertion slot
770 user terminal touch portion
821 header information
822 packet confirmation information
825 command code
826 command parameter
855 encrypted communication data
860 communication data
861 vehicle identification code
882 message authentication code
885 common key set
886 sequence number
890 encryption processing
895 authentication hash function
S1 infrastructure control prohibited state
S2 user intention confirmation state
S3 safety confirmation state A
S4 safety confirmation state B
S5 infrastructure control permitted state S501 externally linked function confirmation
S502 externally linked function response
S511 vehicle identification ID
S512 vehicle identification ID storage completion
S513 infrastructure detailed internal map
S514 detailed map storage response
S515 additional service information
S516 service information reception response
S522 movement instruction permission notification
S523 movement instruction permission completion
S525 loading instruction request
S526 loading sequence completion
S527 loading completion confirmation notification
S531 movement instruction information
S532 movement completion information
S571 vehicle identification ID storage processing request
S572 vehicle identification ID storage completion notification
S573 user confirmation request
S574 user confirmation response
S575 loading request signal
S900 vehicle presence signal
S901 externally linked autonomous driving compatibility confirmation
S902 externally linked autonomous driving compatibility response
S903 communication scheme change notification
S904 communication scheme change response
S905 supporting security scheme notification
S906 security scheme selection notification
S907 infrastructure certificate
S908 common key generation information provision request
S909 common key generation information
S910 vehicle side common key preparation completion notification
S911 vehicle side communication preparation confirmation code
S912 infrastructure side common key preparation completion notification
S913 infrastructure side communication preparation confirmation code
S915 vehicle identification ID designation
S916 vehicle identification ID reception response
S917 infrastructure detailed internal map information
S918 infrastructure detailed internal map reception response
S921 available additional service list
S922 additional service list reception response
S923 movement instruction activation notification
S924 movement instruction activation response
S925 loading request
S926 loading movement instruction
S927 loading movement completion notification
S928 loading sequence completion notification
S929 loading sequence completion response
S930 unloading request
S931 payment request
S932 payment processing information
S933 payment completion response
S935 unloading start request
S936 unloading start response
S937 unloading movement instruction
S938 unloading movement completion notification
S939 unloading sequence completion notification
S940 unloading sequence completion response
S943 unlock notification
S944 unlock response
S945 exit gate notification
S946 departure notification
S947 departure notification response
S951 movement start request
S952 movement start response
S953 movement instruction
S954 movement completion notification
S955 movement sequence completion notification
S956 movement sequence completion response
S981 vehicle identification ID storage request
S982 vehicle identification ID storage response
S983 loading instruction
S985 remote unloading request
S986 payment confirmation
S987 payment permission response
S988 payment completion notification
S989 unloading start notification
S990 vehicle identification ID notification
S992 user terminal reaction request
S993 user terminal reaction response
S996 vehicle identification ID invalidation request
S997 vehicle identification ID invalidation response

The invention claimed is:

1. A control apparatus comprising:
a control device that is configured to control a vehicle that moves autonomously, the control device comprising a function for controlling a movement of the vehicle in accordance with instructions from an external system, wherein when the function for controlling the movement of the vehicle in accordance with instructions from the external system is activated, the control device recognizes that the vehicle has switched from a first communication scheme to a second communication scheme that controls movement of the vehicle by the external system based on information acquired through communication by the first communication scheme with the external system, recognizes that the vehicle has confirmed validity of the external system, recognizes that the vehicle has established encrypted communication between the external system and the second communication scheme based on information acquired through communication by the first communication scheme with the external system, and recognizes that a user of the vehicle is permitted by the external system to move the vehicle, and recognizes that the user is an authorized user of the vehicle.

2. The control apparatus according to claim 1, wherein the vehicle has a function for switching between a communication scheme at time of loading of the vehicle and a communication scheme at time of controlling the movement of the vehicle different from the communication scheme at the time of loading, and the control device recognizes an operation for the switching.

3. The control apparatus according to claim 1 further comprising a function for notifying, when a terminal of the user is operated, the external system of a request required for an operation of the vehicle corresponding to the operation based on a content of communication between the terminal and the vehicle.

4. The control apparatus according to claim 1 further comprising a function for detecting that the destination is outside a management region of the external system during movement in accordance with the instructions from the external system, wherein when a destination outside the management region of the external system is designated despite an abnormality notification to the external system, the permission to follow the external system is canceled, and the control device performs control for autonomous movement to a location available for parking in the external system.

5. The control apparatus according to claim 1, wherein biometric authentication is performed for authenticating the authorized user, and when confirming whether an operation is performed by the authorized user after the authorized user has been detected to have left a driver's seat, the biometric authentication is requested to be performed again.

6. A vehicle that moves autonomously comprising a function for moving in accordance with instructions from an external system, wherein when the function for controlling a movement in accordance with instructions from the external system is activated, the vehicle checks validity of the external system by communicating with the external system, recognizes that encrypted communication with the external system has been established, recognizes that a user of the vehicle permits a movement in accordance with instructions from the external system, and recognizes that the user is an authorized user of the vehicle, wherein
the function also recognizes that the vehicle has switched from a first communication scheme to a second communication scheme that controls movement of the vehicle by the external system based on information acquired through communication by the first communication scheme with the external system.

7. The vehicle according to claim 6 further comprising a function for switching between a communication scheme at time of loading of the vehicle and a communication scheme at time of controlling the movement of the vehicle different from the communication scheme at the time of loading.

8. The vehicle according to claim 6 further comprising a function for notifying, when a terminal of the user is operated, the external system of a request required for an operation of the vehicle corresponding to the operation based on a content of communication between the terminal and the vehicle.

9. The vehicle according to claim 6 further comprising a function for detecting that the destination is outside a management region of the external system during movement in accordance with the instructions from the external system, wherein when a destination outside the management region of the external system is designated despite an abnormality notification to the external system, the permission to follow the external system is canceled, and the vehicle autonomously moves to a location available for parking in the external system.

10. The vehicle according to claim 6, wherein biometric authentication is performed for authenticating the authorized user, a result of the biometric authentication is invalidated when the user is detected to have left a driver's seat after the biometric authentication, and the biometric authentication is requested to be performed again before an operation limited to the authorized user.

11. A system that causes a vehicle to move autonomously, wherein when the system instructs the vehicle to move and activates a movement of the vehicle, the system communicates with the vehicle to make the vehicle recognize a validity of the system, make the vehicle recognize that encrypted communication has been established, make the vehicle recognize that a user of the vehicle permits the vehicle to move autonomously, make the vehicle recognize that the user is an authorized user of the vehicle, and the system recognizes that the vehicle has switched from a first communication scheme to a second communication scheme that controls movement of the vehicle by the external system based on information acquired through communication by the first communication scheme with the external system.

* * * * *